United States Patent
Wallerstorfer et al.

(10) Patent No.: US 8,252,180 B2
(45) Date of Patent: Aug. 28, 2012

(54) TANK

(75) Inventors: Kurt Wallerstorfer, Strasswalchen (AT); Andreas Wawrla, Widnau (CH); Roland Scholz, Haan (DE)

(73) Assignee: Aquis Wasser-Luft-Systeme GmbH, Lindau, Zweigniederlassung Rebstein, Rebstein (CH)

( * ) Notice: Subject to any disclaimer, the term of this patent is extended or adjusted under 35 U.S.C. 154(b) by 305 days.

(21) Appl. No.: 12/310,061

(22) PCT Filed: Aug. 10, 2007

(86) PCT No.: PCT/EP2007/007094
§ 371 (c)(1),
(2), (4) Date: Apr. 16, 2009

(87) PCT Pub. No.: WO2008/017495
PCT Pub. Date: Feb. 14, 2008

(65) Prior Publication Data
US 2009/0242472 A1    Oct. 1, 2009

(30) Foreign Application Priority Data
Aug. 10, 2006 (DE) .......................... 10 2006 037 636

(51) Int. Cl.
*B01D 35/30* (2006.01)
*B01D 24/00* (2006.01)

(52) U.S. Cl. ........ 210/232; 210/807; 210/265; 210/268; 210/282; 210/287; 210/503

(58) Field of Classification Search .................. 210/135, 210/232, 807, 265, 268, 282, 287, 503
See application file for complete search history.

(56) References Cited

U.S. PATENT DOCUMENTS

| 3,206,033 A | 9/1965 | Kern, Jr. |
| 5,342,518 A | 8/1994 | Posner et al. |
| 5,860,354 A | 1/1999 | Jouatel et al. |
| 5,897,770 A * | 4/1999 | Hatch et al. .................. 210/101 |
| 6,576,129 B1 | 6/2003 | Reid |
| 2002/0144937 A1 | 10/2002 | Wilberscheid |

(Continued)

FOREIGN PATENT DOCUMENTS

CH    432 395    9/1967

(Continued)

OTHER PUBLICATIONS

U.S. Appl. No. 12/310,062, filed Feb. 10, 2009.

(Continued)

*Primary Examiner* — Krishnan S Menon
*Assistant Examiner* — Allison M Gionta
(74) *Attorney, Agent, or Firm* — Breneman & Georges

(57) ABSTRACT

A tank for water-carrying appliances is proposed, in particular domestic appliances or appliances for the treatment of foods and/or beverages, such as beverage vending machines, in particular coffee vending machines, drinking water dispensers, cooking and baking appliances, steam appliances, in particular steam irons, steam cleaners, high-pressure cleaners, air purifiers and conditioners or the like, a suction connection on the tank for the intake of water from the tank, with means for generating a vacuum, and a filter connection for connecting a filter cartridge inside the tank being provided, while it is ensured that only one permitted filter type is used. A tank according to the invention is characterized by mechanical coding structures at the filter connection element in order to exclude the use of a filter cartridge which does not correspond to the tank.

24 Claims, 32 Drawing Sheets

U.S. PATENT DOCUMENTS

Figure 1:
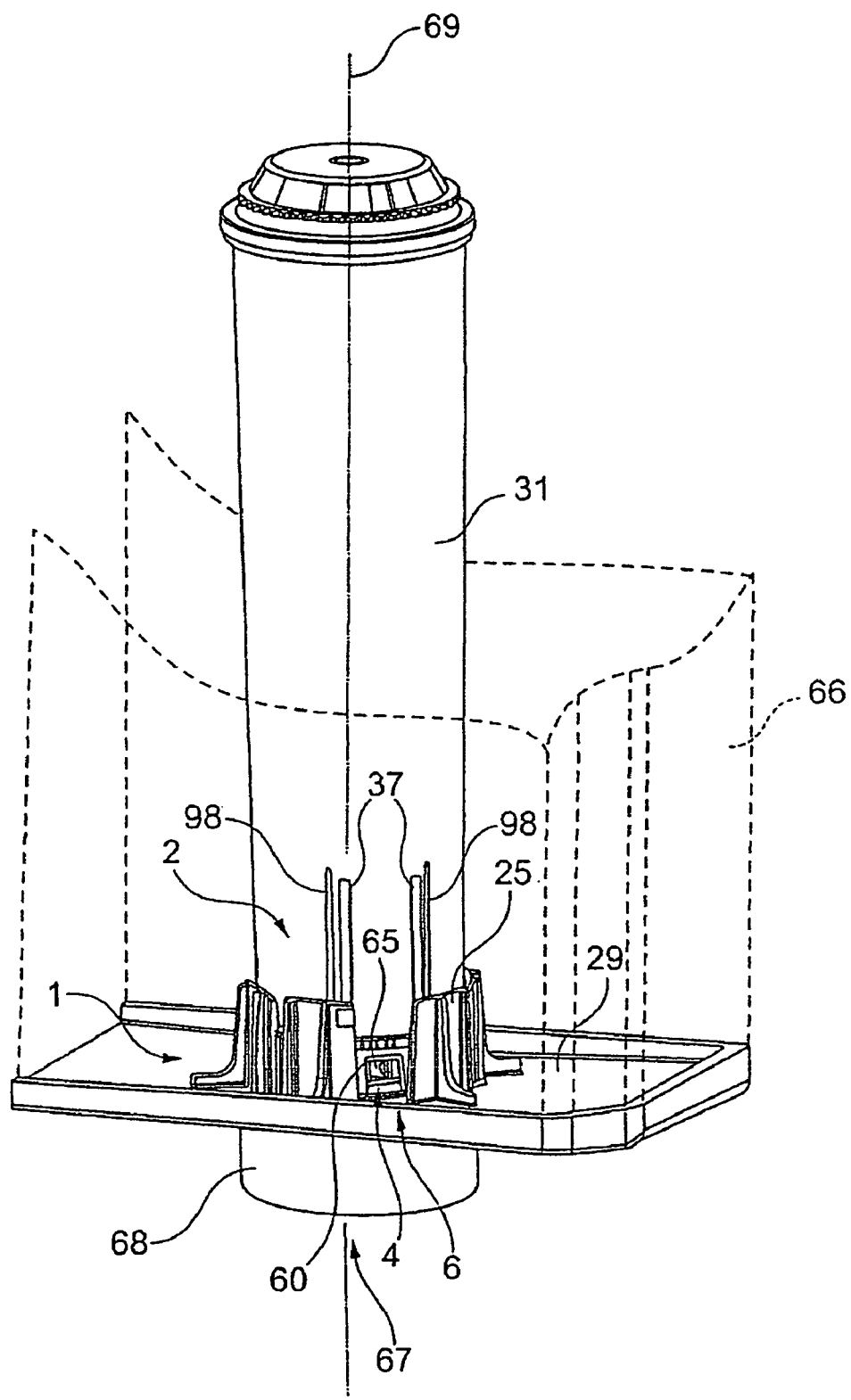

| | | | |
|---|---|---|---|
| 2002/0170279 A1 | 11/2002 | Gustafson | |
| 2004/0129627 A1 | 7/2004 | McGibbon | |
| 2004/0182777 A1 | 9/2004 | Stankowski | |
| 2004/0211931 A1 | 10/2004 | Olson | |
| 2006/0186031 A1* | 8/2006 | Fick et al. | 210/235 |
| 2007/0289913 A1 | 12/2007 | Namur | |

FOREIGN PATENT DOCUMENTS

| | | |
|---|---|---|
| DE | 30 14 493 A1 | 10/1981 |
| DE | 691 05 539 T2 | 8/1991 |
| DE | 196 48 405 A1 | 10/1998 |
| DE | 197 17 054 C2 | 11/1998 |
| DE | 198 27 623 A1 | 1/1999 |
| DE | 198 27 297 A1 | 12/1999 |
| DE | 203 80 258 U1 | 4/2005 |
| DE | 10 2004 026188 A1 | 12/2005 |
| DE | 10 2004 0261888 A1 | 12/2005 |
| DE | 10 2004 049877 A1 | 4/2006 |
| GB | 2 346 568 A | 8/2000 |
| RU | 2 131 695 C1 | 6/1999 |
| WO | WO 01/80967 A1 | 11/2001 |
| WO | WO 02/13944 A2 | 2/2002 |
| WO | WO 2004/014519 A2 | 2/2004 |
| WO | WO 2006/040120 | 4/2006 |
| WO | WO 2006/050114 | 5/2006 |
| WO | WO 2006/050114 A1 | 5/2006 |
| WO | WO 2008/049547 A2 | 10/2007 |
| WO | WO 2008/049547 A2 | 5/2008 |

OTHER PUBLICATIONS

U.S. Appl. No. 12/310,071, filed Feb. 10, 2009.
U.S. Appl. No. 12/310,072, filed Feb. 10, 2009.
U.S. Appl. No. 12/312,037, filed Apr. 23, 2009.

* cited by examiner

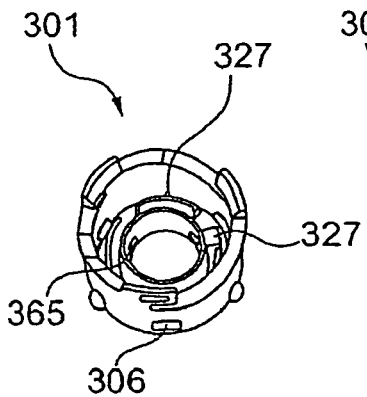
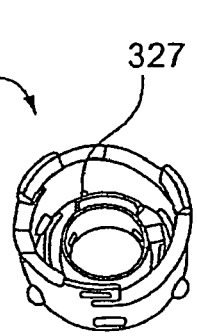
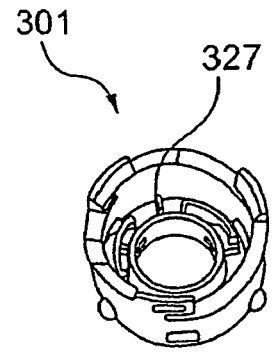
Fig. 15　　　　Fig. 17　　　　Fig. 19
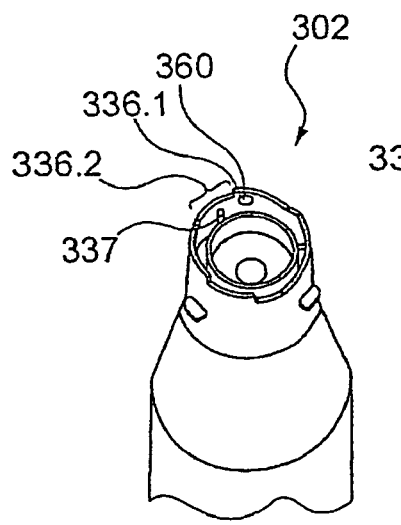
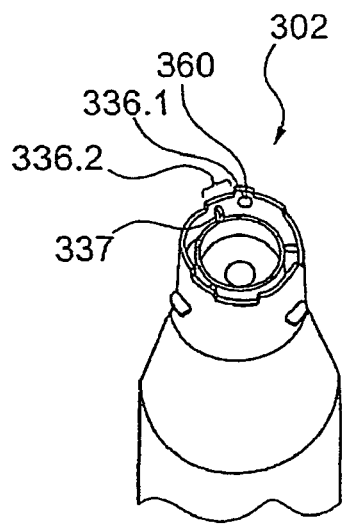
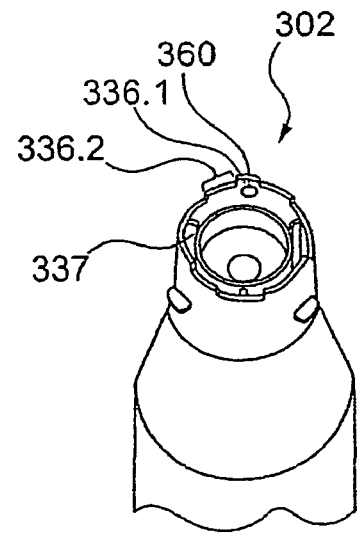
Fig. 16　　　　Fig. 18　　　　Fig. 20

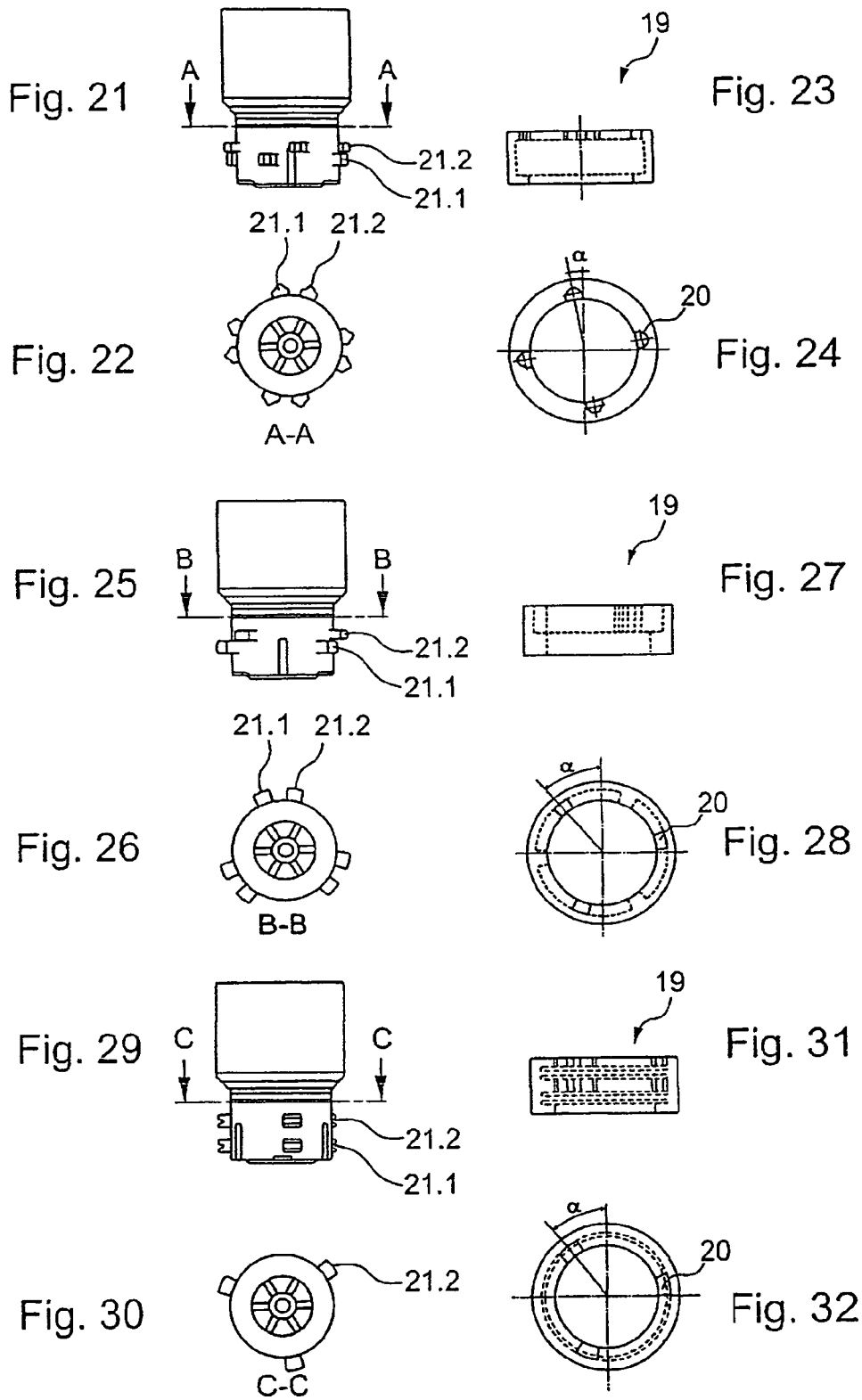

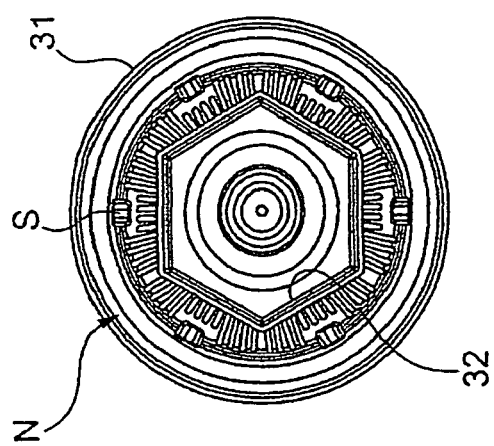
Fig. 37
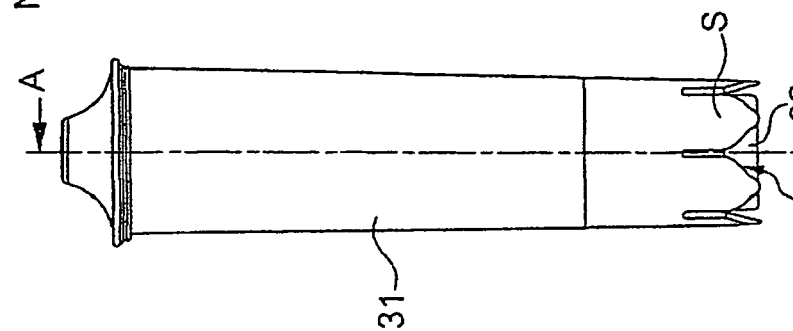
Fig. 36 Fig. 35
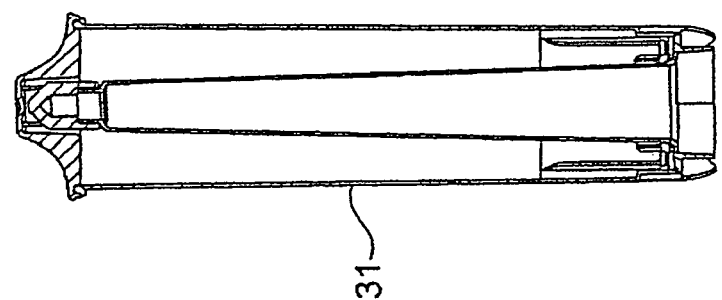
Fig. 34
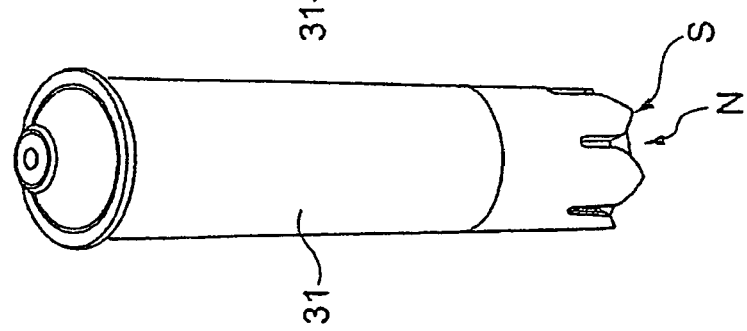
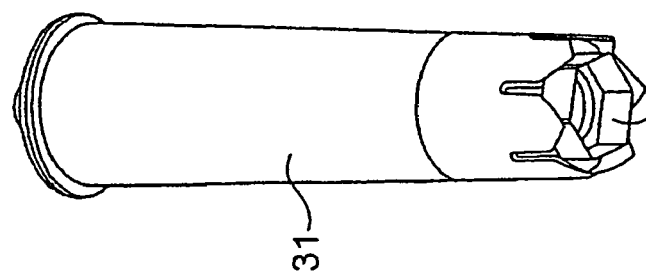
Fig. 33

TANK

CROSS REFERENCE TO RELATED APPLICATIONS

The subject matter of this application is related to the subject matter of U.S. application Ser. No. 12/310,062 filed Feb. 10, 2009; U.S. application Ser. No. 12/310,071 filed Feb. 10, 2009; U.S. application Ser. No. 12/310,072 filed Feb. 10, 2009 and U.S. application Ser. No. 12/310,037 filed Apr. 23, 2009.

BACKGROUND OF THE INVENTION (1) Field of the Invention

The invention relates to a tank with a filter cartridge for water dispensing appliances, particularly domestic appliances such as beverage vending machines including coffee vending machines, drinking water dispensers, cooking and baking appliances, steam appliances such as steam irons, steam cleaners, high-pressure cleaners, air purifiers and conditioners or the like and particularly those appliances having a suction connection on the tank for the intake of water from the water tank with a vacuum generating device which has a filter connection and a filter disposed inside the tank. More particularly the invention pertains to a tank having a specially constructed outlet which has a blending element which interacts with a specially constructed filter cartridge having a blending element as well as a specially constructed filter cartridge and adapter.

(2) Description Of Related Art Including Information Disclosed Under 37 CFR 1.97 and 1.98

In various machines, for example in coffee or Espresso machines, a water tank for storing a liquid, in the case of coffee or Espresso machines for storing water, is provided, a filter cartridge being insertable into the tank in order to treat the water before processing in the machine. Known filter cartridges have, in the lower region, an inlet through which the water is sucked in by the associated machine. In this case, the water is conducted over a filter bed and passes into the machine via a connection of the filter cartridge to a corresponding suction connection of the water tank.

For the machine to operate reliably, it is very important that it is supplied only with water having a water quality conforming at least to the minimum requirements, for which purpose a filter cartridge having defined filter parameters is preferably used. If a filter cartridge is defective, the machine is supplied with insufficiently or wrongly treated water, and this may lead to adverse effects, for example calcification or the like, even amounting to machine defects. The machine control is not capable of initiating the intended maintenance intervals in due time if it is based on a filter cartridge of the correct type, but this is not actually used. If inadequate filter cartridges are used, problems arise not only in terms of the operating reliability of the machine, but also with regard to warranty questions, etc. It is therefore very important to ensure that only licensed filter cartridges are even employed.

On the other hand, it is possible that the water to be filtered already has a very high quality, so that, at least in specific applications, the filter action achieved by the filter to be used is not altogether necessary to the full extent.

BRIEF SUMMARY OF THE INVENTION

The object of the invention, therefore, is to propose a tank and a filter cartridge, by means of which improved operation is possible.

Correspondingly, a tank according to the invention with a suction connection element for sucking in water from the tank by means of a vacuum and with a filter connection for connecting a filter cartridge inside and/or outside the tank, is distinguished in that a blending device or blend setting is provided, by means of which a bypass stream of unfiltered or otherwise treated water is routed past the filter bed. As a result, the quality of the water supplied to a water-treating and/or water-consuming appliance can be set, for example specifically to the application and/or to the appliance, by mixing the water filtered by the filter cartridge and the water not filtered by it or by mixing the water filtered by one filter stage with water filtered by one or more other filter stages. Furthermore, the operational running time can thus be optimized in that the filter does not have to be exchanged sooner than is the case when a water quality sufficient for the respective application is provided as a result of the exhaustion of the filter material. If a comparatively smaller quantity of water is passed through by virtue of the blending according to the invention of the water to be filtered, therefore, the filter material used for this purpose can thus be available for longer because of its consequently lower degree of exhaustion over time.

A tank-side filter connection element is to be understood, according to the invention, to mean elements arranged and/or formed directly and/or indirectly on the tank, such as projecting and/or sunken reception and/or fixing and/or coding and/or sealing elements. These may be designed, for example, as connection pieces connected fixedly to the tank or designed to be connectable, as hooks, lugs, adapters or the like.

The tank-side filter connection is in this case preferably formed in the bottom region of the tank. It may perfectly well, however, also be arranged at least partially or even completely in one corner and/or on a side wall of the tank on the inside and/or on the outside, depending on the location at which the connection between the water tank and an appliance-side outflow line is provided. For example, a tank-side filter connection element led out of the tank at an upward distance from the bottom of the tank in the operational installation position of the latter may also be envisaged.

By means of such embodiments, for example, a can-like and/or drawer-like tank can be implemented, in which, in turn, only a filter cartridge provided with a corresponding coded filter-side tank connection element can be inserted. The appliance-side connection of the tank connection may, both in this embodiment and in the embodiments described above, be connected as a plug connection to a correspondingly complementary appliance-side tank connection element. The tank-side filter connection element located at a distance from the tank bottom may also be designed, for example, as a filter connection element suspendable on a tank wall, for example in the form of a pipeline which, when a cartridge with an appropriately matching coding is inserted, serves for discharging the untreated water introduced into the tank and filtered by the filter cartridge.

If the water inlet ports for the filter stage are in an appropriately low-lying arrangement, the essential contents of the tank can be emptied even by means of an embodiment of this type, so that the latter has no or only an insignificant quantity of dead water which cannot be routed through the filter stage.

Particularly advantageously, the blending device may in this case be designed such that that quantity of the unfiltered or otherwise treated water which is to be admixed can be set. This is possible, for example, by means of one or more bypass ports which are opened in a variably settable manner in order to set the water quantity conducted past the filter bed. Such a blend setting may be implemented, for example, via the angular placing on the installation position of the filter cartridge. In a particularly preferred embodiment, this may also take place in combination with a coding structure having the stipulation of fixed angular placings via the installation position of the cartridge. Reference is made in more detail below to possible coding structures.

The blending quantity of unfiltered or otherwise treated water may in this case be set by means of correspondingly designed ports which connect the tank interior directly to the outflow of the tank, through which ports the water filtered by the filter cartridge is supplied to the respective appliance. Depending on the angle of insertion of the filter cartridge, if appropriate as a function of such a coding structure, these ports may be designed in a different size or opened to a different size and/or opened in different numbers, so that, depending on the installation position of the filter cartridge, a different blending ratio is obtained or the blend is closed completely.

Thus, for example in the case of a hexagonal coding structure in the connection region of the filter cartridge in the tank-side connection piece provided for connecting to the filter cartridge, ports of different size may be provided as a bypass, which, when a filter cartridge is plugged on, are closed as a function of the angle. In one embodiment, the bypass ports are in this case formed preferably in the sealing surface, so that, when the filter cartridge is inserted, all the ports, with the exception of the port provided as a bypass port, are sealed off by means of a correspondingly shaped connecting seal of the filter cartridge. In another version, for example, a blending device comprising an actuating element may also be provided, in which a specific blending ratio can be set by means of an inserting and/or positioning movement for the filter cartridge, as is explained in more detail in relation to the drawing.

However, the blending quantity may, for example, also be set in another way, utilizing the coding structure, thus, for example, a coding structure may serve at the same time as a mechanical driver in order to actuate an adjusting element in the tank region mechanically by means of the filter cartridge. In the case of a hexagonal connecting socket in the tank region, for example, a corresponding hexagonal contour of the filter cartridge serves for rotating a rotatable socket element in order to set the blending quantity. The hexagonal coding structure of the filter cartridge then not only has a coding function, but at the same time is a mechanical actuating element, as if it were in the manner of a hexagonal socket wrench.

In a particularly preferred embodiment, a combination of the above-described blending device or blend setting of the tank/filter connection with a coding structure likewise provided for this purpose is thus provided. In a particularly preferred embodiment of the coding structure, the filter connection of the tank may be provided with at least one mechanical coding structure which comprises an axial projection and/or at least one axial recess in which fits with a complementary coding structure of the filter cartridge, said coding structure correspondingly comprising at least one recess and/or at least one projection.

However, other coding structures may also perfectly well be envisaged, so that, in a further preferred embodiment, a polygonal enciphering and/or connecting structure for the tank/filter connection may also be provided, to which reference is likewise made in more detail in the following text. It is also perfectly conceivable, further, to have combinations of polygonal coding structures oriented axially with respect to the connecting socket, if appropriate additionally also in combination with radially oriented coding structures.

The structures on the filter connection of the tank must therefore interact according to a key/lock principle with corresponding connecting structures of a filter cartridge, so that the filter cartridge can be inserted operably into the water tank. A machine or tank manufacturer can thereby ensure that only filter cartridges ensuring that the machine operates reliably are employed. The vacuum for suction extraction may be generated, for example, via a suction pump.

In addition to such axial projections and/or recesses, enciphering elements may also be provided in the radial direction of the filter connection element or the filter cartridge.

In a particularly advantageous embodiment of the invention, the filter connection of the tank and a connection piece of the filter cartridge are designed such that they at least partially surround one another. Particularly in such an embodiment, for example to supplement axially oriented coding structures, for example for a further differentiation of the enciphering structure, such as for various applications and/or customers, these, too, may be arranged in the radial direction, that is to say transversely with respect to the axis of the connection piece of the inserted filter cartridge. These may readily be combined with the most diverse possible axial coding structures, for example on the end face of the connection piece or in the region of the tank bottom.

Preferably, the coding structures are at least partially designed at the same time as fixing elements for fastening the filter cartridge. In this case, the coding structures are preferably designed with an undercut, so that a fixing of the filter cartridge to the tank bottom or to a fastening element attached to the tank bottom can take place, for example by rotation or by snapping, in which case, of course, the corresponding coding structures must fit with one another in order to ensure satisfactory operation with a correct filter cartridge.

In a particularly simple embodiment, the coding structures may also be designed as a bayonet fastening. For this purpose, projections running transversely with respect to the axis of the filter connection element are preferably provided on the filter connection of the tank and/or on the tank connection of the filter cartridge and match with matching reception and/or guide tracks on the tank connection of the filter cartridge and/or on the filter connection of the tank.

However, it is also possible, for example, to form double bayonets or multiple bayonets, in which case this double or multiple structure may relate both to the circumferential surface of a corresponding connection element, in a top view, and to its longitudinal extent. In this case, with respect to the top view of the circumferential surface, differently spaced angular arrangements between individual and/or a plurality of double or multiple bayonet elements may also be implemented. As a result, encipherment for differently set-up bayonet structures can be achieved according to the complementary bayonet elements formed in each case, while in each case a bayonet connection may be provided completely in a first or a second or a further plane or else no passage for a bayonet element provided on an incorrectly coded filter cartridge, so that an operational insertion of this cartridge is prevented.

Owing to the spatial arrangement of projections and reception or guide contours, particularly in a combination of axial and radial elements, for example, a reliable mechanical coding may also basically be created for an entire cartridge family, in which case, for example, only individual structural elements of the coding make one or, if appropriate, even a plurality of correct filter cartridges from this insertable operably or can prevent this. However, for example, different arrangements and shapes may also be provided for the coding of different filter types with different machines.

Furthermore, radially projecting, for example wing-like projections on the cartridge may afford the supplementary advantage of wider guidance. Moreover, in such embodiment, an easier introduction into corresponding guide tracks in the tank socket is possible, since the projections or wings of the cartridge can easily be seen by an operator during introduction and therefore at least also allow a rough prepositioning or filter orientation during the insertion of the cartridge. Furthermore, these radial projections give rise in the region of the fastening to an enlargement of the circumference of the cartridge, so that the stability of the anchoring is improved.

Moreover, such projections or wings on the filter cartridge may be manufactured from material which is more elastic than the material of the tank socket, so that a better bracing of the filter cartridge in the axial direction can be implemented via a spring-like action.

Basically, the embodiment has a bayonet fastening in conjunction with an axial seal which is pressed down in the axial direction with respect to a tank-side seal is advantageous. The bayonet fastening offers a corresponding tightening torque in the axial direction, while the axial seal affords corresponding advantages during insertion. Thus, no frictional forces of any kind have to be overcome in order to press down and release an axial seal during the insertion and removal of a filter cartridge.

The abovementioned features of a bayonet fastening with radially projecting projections or wings on the filter cartridge afford said advantages, particularly in conjunction with an axial seal. The corresponding projections and guide tracks of the bayonet fastening may in this case serve, as before, as a supplementary coding structure.

Coding structures may basically also be employed as actuating members in the region of the tank connection. Thus, for example, a switching mechanism attached to the tank can be actuated by means of the coding structures of the filter cartridge and can serve for signaling the blending radio set by the position of the filter cartridge and/or the correct fit of the filter cartridge and/or for detecting the correct type of cartridge by the associated appliance. Such a configuration of the coding elements as an actuating member is possible in all other types coding structures.

A further differentiation of the coding structure may be implemented, for example, by a combination with various shapes of the circumference for the tank-side filter connection. Thus, an additional coding may be carried out, for example, by means of a deviation from the previous circular cross-sectional shapes of corresponding connection elements. For example, it is possible, by means of an oval shape of the tank-side filter connection, to ensure that, even in the case of axial and, if appropriate, also radial coding structures otherwise suitable for the insertion of the filter cartridge, only a filter cartridge matching correspondingly with this can be used.

In a development of this embodiment, the filter connection of the tank may also be provided with a circumferential contour in the form of a polygonal line. Furthermore, with a corresponding structuring of the axial and, if used, also radial coding structures, such a shape allows a more extensive angular coding for various insertion angle positions of the filter cartridge.

Preferably, for this purpose, a rotationally symmetrical circumferential contour on the filter connection element is provided. With the aid of a rotationally symmetrical configuration, various predetermined angular positions during the insertion of a filter cartridge can be implemented, to which, as required, an additional function may be assigned, depending on the angular position. One example of a circumferential shape of the tank-side filter connection element according to the exemplary embodiments described above would be afforded, for example, by a hexagonal cross-sectional contour. Such a contour allows, for example, six different angular positions of a filter cartridge matching this. The same applies correspondingly to square, hexagonal, octagonal or suchlike structures.

The tank-side filter connection element may in this case be designed as a recess with a corresponding inner circumference and/or outer circumference or else as a projection with a corresponding outer circumference and/or inner circumference. A connection piece may accordingly be provided with the corresponding circumferential contour, either on the inner circumference and/or on the outer circumference, both for plugging in and for plugging on a matching connecting element of the filter cartridge.

Advantageously, the circumferential surface shaped in this way is designed at the same time as a sealing surface. The seal can therefore advantageously be produced, preferably injection-molded, from the same material as the cartridge housing. This ensures that only a filter cartridge having a matching shape of the seal for the filter outlet line can be inserted operably into the tank and be connected to the tank-side filter connection element.

A circumferential surface which is shaped, as described above, may also be used as a mounting for the filter cartridge, said mounting matching with a correspondingly shaped mounting element in the tank region. In this case, too, a coding structure is implemented by means of the circumferential surface.

The coding structure, particularly when it at the same time forms a sealing surface, may have an axially extending cross-sectional taper, for example in the manner of a cone frustum or pyramid frustum. This allows easier leaktight plugging on without major frictional forces.

As already mentioned several times, the corresponding coding structures are to be provided on sides of the filter cartridge and matched with the tank-side coding structures. If the sealing surface of the tank-side filter connection is included in the shape of the coding structures, then, in a particular embodiment, the seal itself, as a filter-side tank connection element, is provided with the corresponding shape. Thus, for example in the case of a hexagonal cross section of the tank-side filter connection element, there is the possibility of providing a correspondingly hexagonal seal as a counterpiece. This may in this case be designed as an axial seal and/or as a radial seal, which either is plugged into a correspondingly shaped recess, hexagonal in the above exemplary embodiment, or else is plugged onto a likewise shaped projection.

In the case of a cross-sectional taper, as stated above, the seal is in this case also preferably adapted correspondingly, so that, when plugged onto a projection designed, for example, as a hexagonal pyramid frustum, it fits snugly against it over a large area.

In this embodiment, only a filter cartridge having a correspondingly shaped seal can be inserted operably.

In a particular embodiment, fixing means projecting from the bottom of the tank and engaging on the outer circumference of the filter cartridge are provided, which may additionally have a coding property. One example of a fixing is the latching or snapping of the filter cartridge in corresponding latching or snapping elements which, if appropriate, may likewise be designed as a coding structure.

A further possibility for coding the tank/filter connection is to vary the orientation of the longitudinal axis running through the filter-side tank connection element with respect to a longitudinal axis running through the filter housing, so that these form, for example, a specific, in particular acute angle to one another. For this purpose, the filter-side tank connection element may be designed to be preferably slightly bent with respect to the cartridge housing. Cartridges which have no connection element with such a bent orientation in position cannot be inserted operably in a water tank of correspondingly narrow design. A further advantage of such coding is that even curved and/or arcuately designed water tanks of comparatively long longitudinal extent can be equipped in an operationally safe manner and reliably, since, by virtue of the angling of the two longitudinal axes with respect to one another, a correspondingly reliably sealing and fixing tank/filter receptacle can be implemented by means of an optimal orientation of the tank-side filter connection element in the tank and by an insertion movement for the angular cartridge which deviates from a vertical introduction movement.

If appropriate, for this purpose, further guide elements for reliably connecting the tank-side filter connection element to the filter-side tank connection element may be provided on the filter cartridge and/or on the tank. Particularly suitable for this purpose are, for example, ribs which are provided on the tank side and form a tapering cross section in the introduction direction and by means of which the filter-side connection element and/or the filter housing and/or a guide structure, such as, for example, a connecting ring or the like, projecting from the filter housing are guided during the insertion of the filter cartridge. Such a filter-side guide structure may be designed as a circumferential surface, and it may also have slot-shaped contours formed complementarily to the above-described ribs and/or another suitable structure.

In the case of rib/slot coding, once again, a further coding possibility is afforded by a different angular coding, as seen in a top view, for individual or a plurality of such complementary elements. Only when the slot/rib combination and the angled tank/filter connection structure fit together can a corresponding filter cartridge be inserted operationally.

However, this guide and coding structure described here can also be used perfectly well, with the same type of action, for filter connection elements which do not have an angled design.

An additional guiding and/or coding function may be implemented by means of projecting tips or recesses which are formed on the end face of the filter cartridge and which can engage into correspondingly complementarily shaped tank-side coding and/or guide structures.

To implement a blending device, however, corresponding ports and/or ducts may also be formed in the filter cartridge, which, for example with and/or without interaction with a tank-side blending element, make it possible to have a blend for the water filtered through the filter cartridge. This also applies correspondingly to the use of a connection and/or lengthening element interposed, if appropriate, between the tank-side and the filter-side connection element, such as, for example, an adaptor with the same and/or another connecting and/or coding and/or fixing and/or sealing structure.

In order to ensure that, for bypassing the coding according to the invention, the tank of a machine cannot be exchanged for an unlicensed tank without coding structures for the use of unlicensed filter cartridges, it is recommended to provide the interface between tank and machine likewise with coding structures which may be identical to one of the exemplary embodiments described above. In this case, the machine-side and the tank-side connection elements are to be coded correspondingly.

The invention also covers versions which implement the connection of the filter cartridge via separate adaptor parts connectable to the filter cartridge or to the tank. The same applies to the connection between the tank and associated appliance.

The invention can be used advantageously in all water-carrying appliances, in particular in water-carrying domestic appliances or appliances for the treatment of foods and/or beverages, such as beverage vending machines, in particular coffee vending machines, drinking water dispensers, cooking and baking appliances, steam and/or high-pressure cleaners, air purifiers and conditioners or the like, which have a corresponding water tank.

BRIEF DESCRIPTION OF THE SEVERAL VIEW OF THE DRAWING(S)

Figure 2:
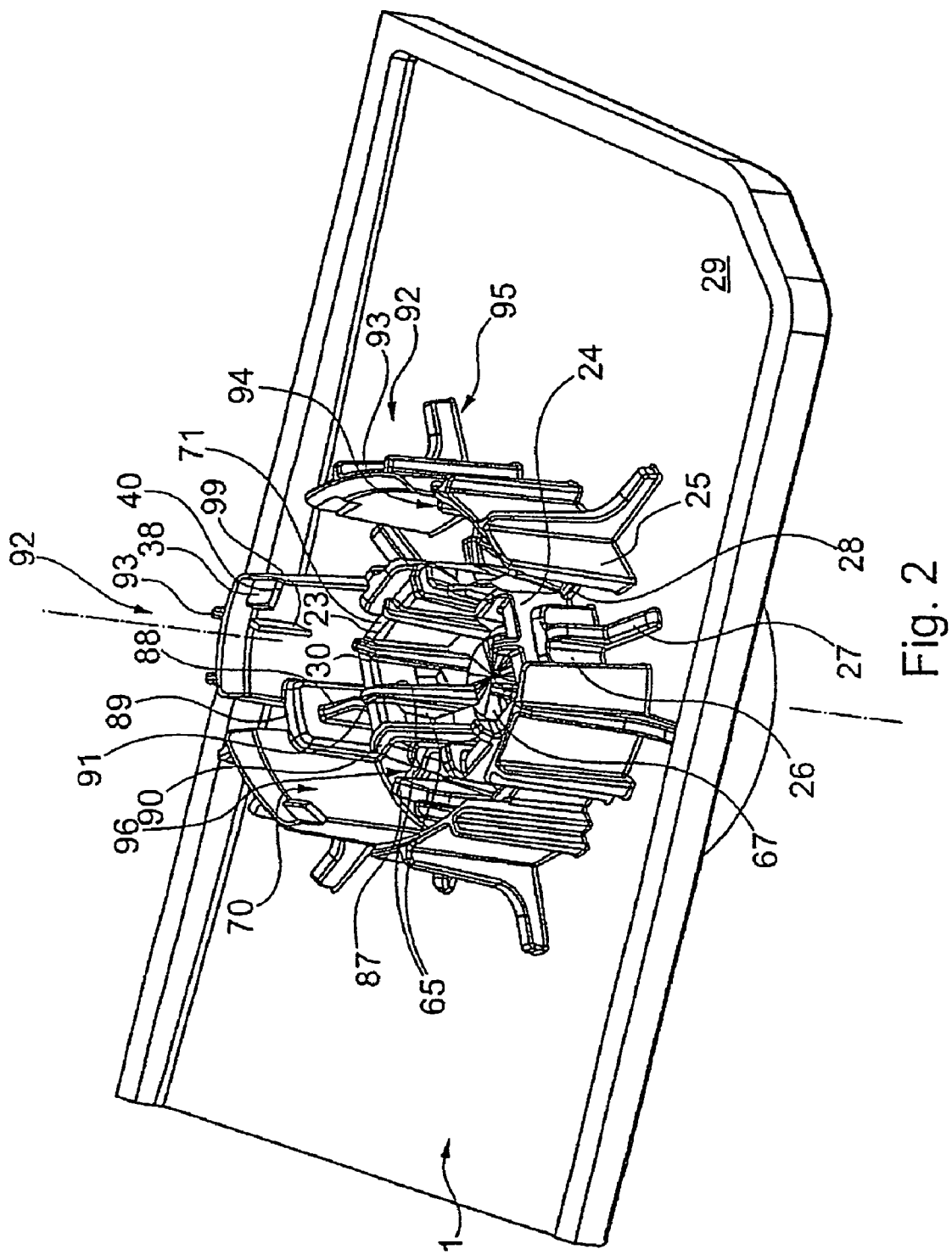
Figure 3:
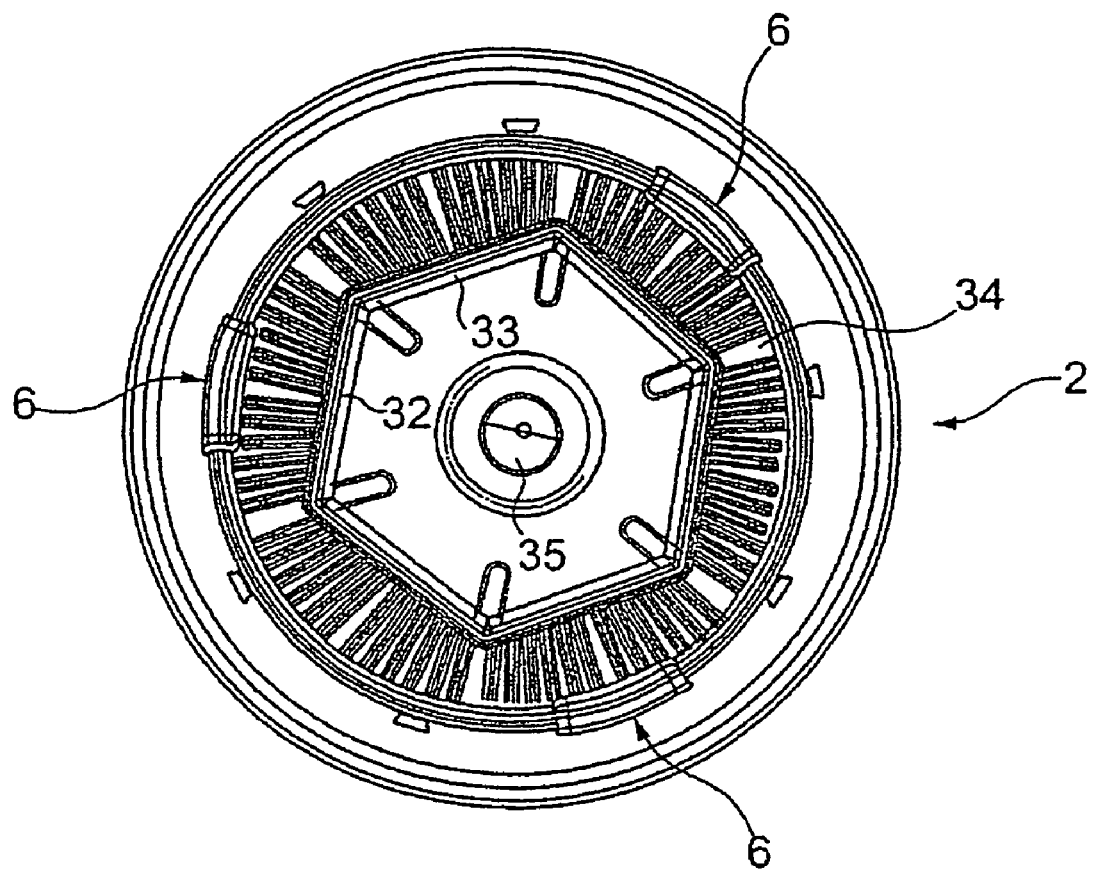
Figure 4:
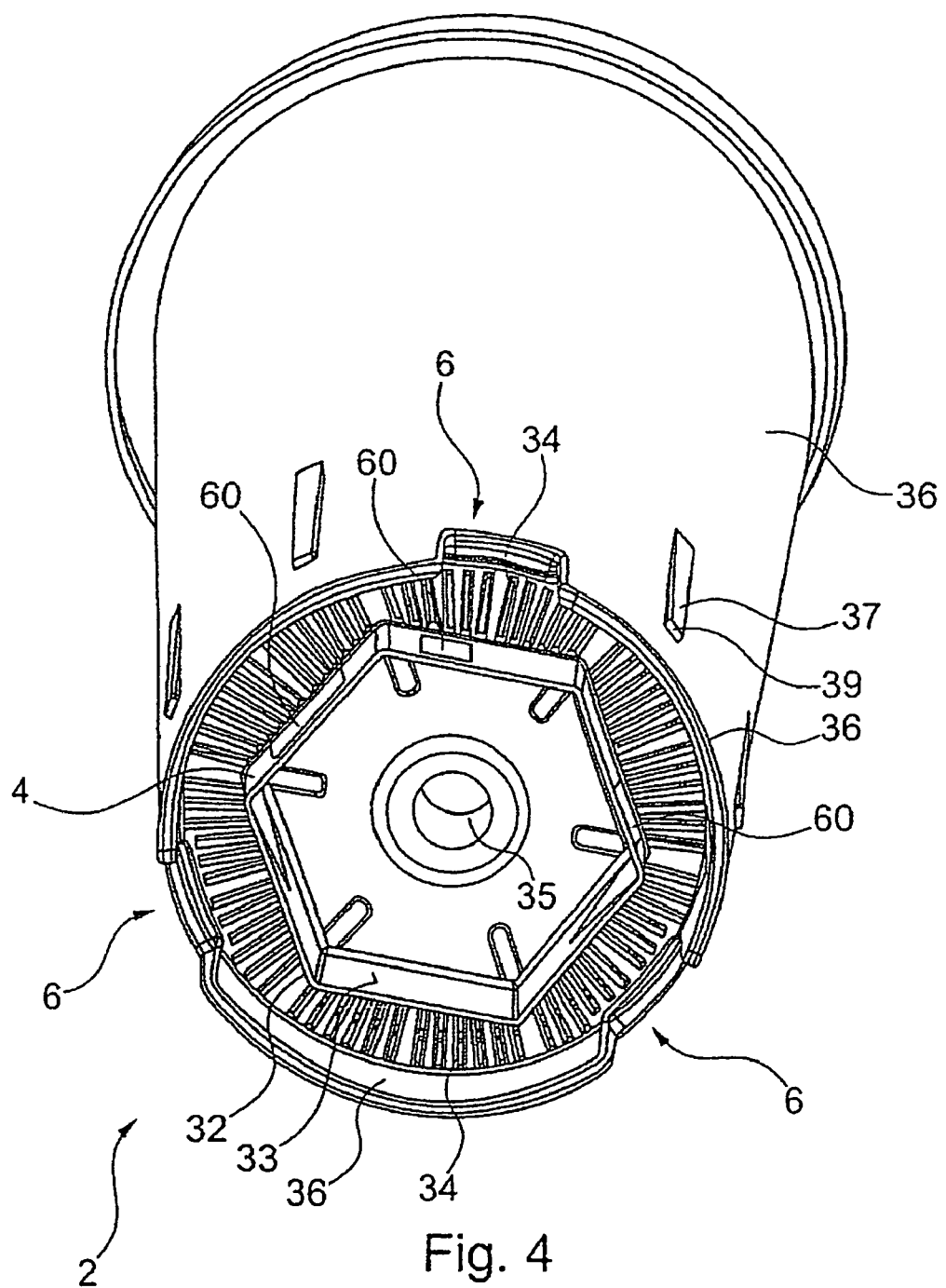
Figure 5:
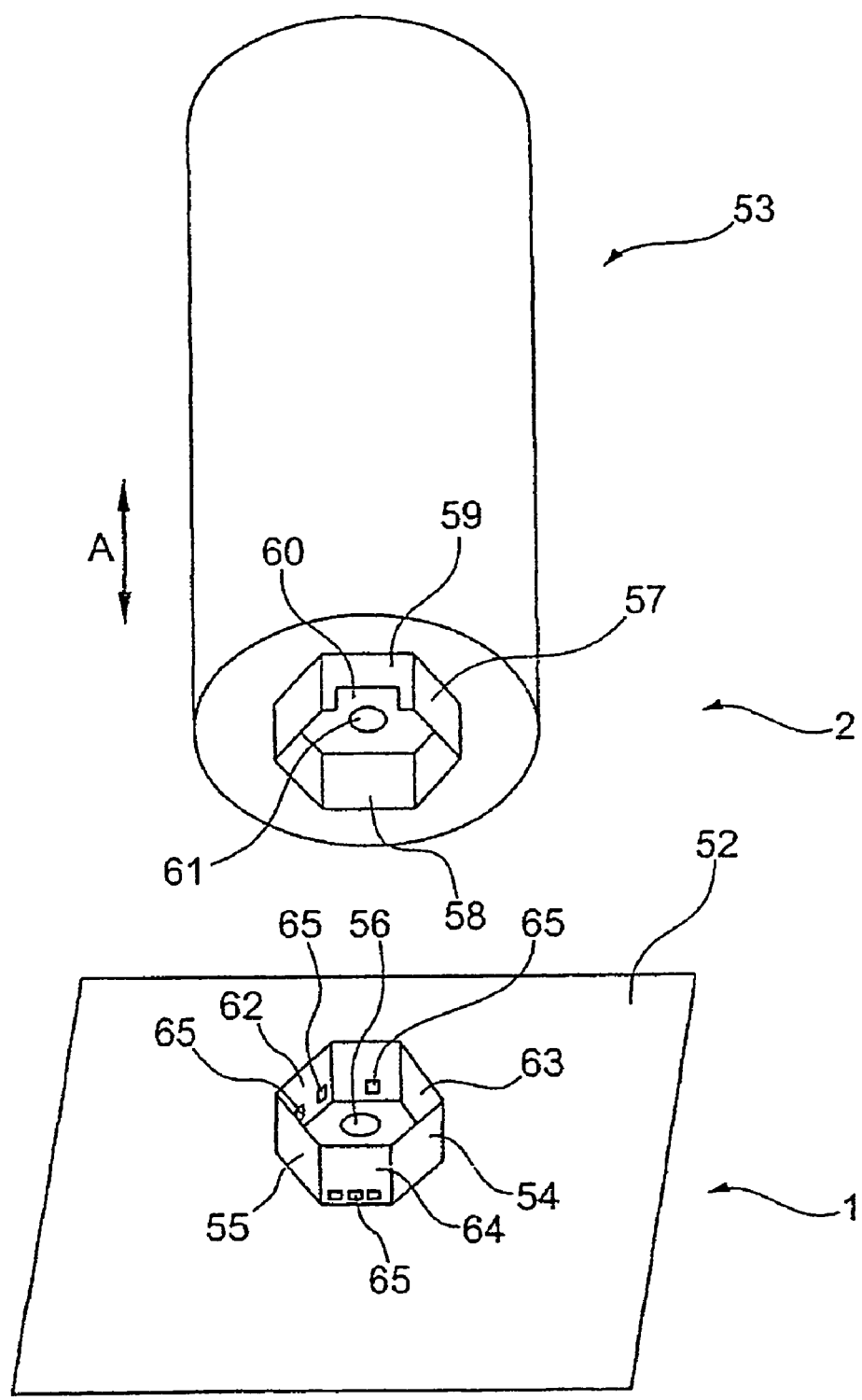
Figure 5A:
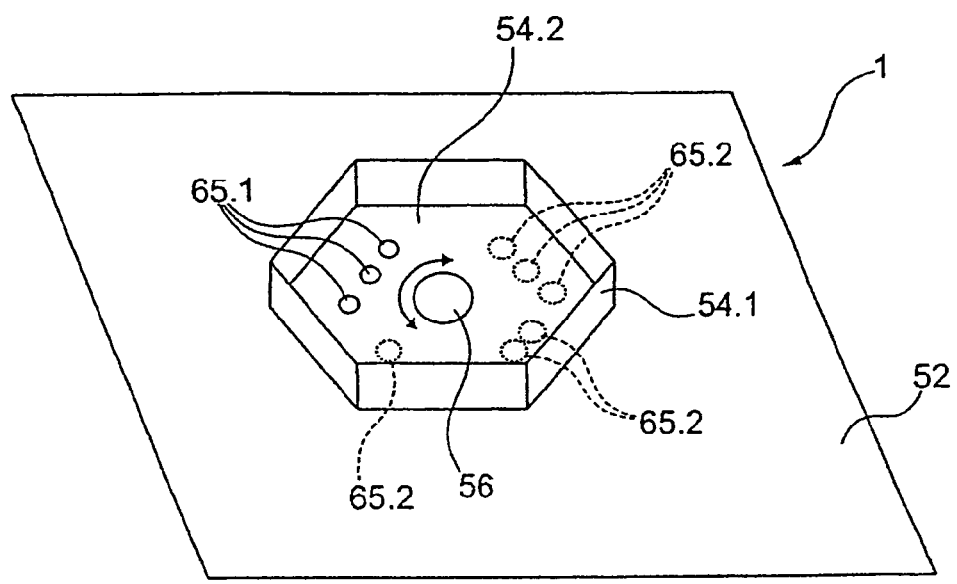
Figure 6:
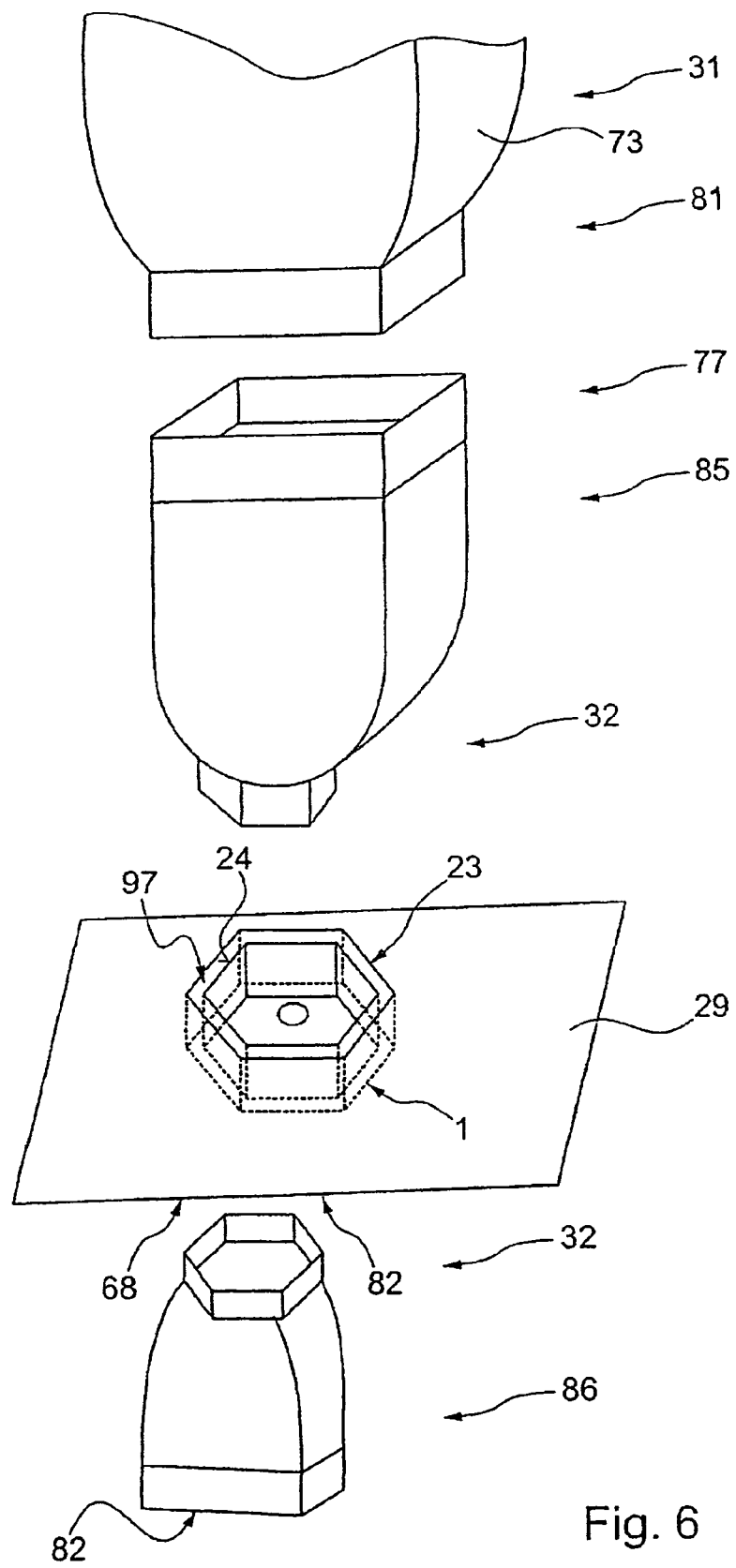

Various exemplary embodiments of the invention are illustrated in the drawing and are explained in more detail below with reference to the figures in which, in particular, FIG. 1 shows a side view of a bottom cutout of a water tank with an inserted filter cartridge, FIG. 2 shows a top view of a bottom cutout of a water tank according to FIG. 1, FIG. 3 shows a top view of the tank connection element of a filter cartridge according to FIG. 1, FIG. 4 shows a perspective illustration of a filter cartridge according to FIG. 1, FIG. 5 and FIG. 5*a* show two design variants with angle-dependent (FIG. 5) and blending quantity setting FIG. 5*a*, FIG. 6 shows, by way of example and diagrammatically, a filter-side and an appliance-side tank connection, in each case in combination with a correspondingly designed adaptor piece, and FIGS. 7-56 show further possible embodiments, illustrated in different views by way of example and diagrammatically.

DETAILED DESCRIPTION OF THE INVENTION INCLUDING BEST MODE

FIG. 1 shows connection elements 1, 2 of a tank 66, illustrated diagrammatically in cutout form by dashed lines, and of an associated filter cartridge 31. Illustrated on the tank side is a connecting socket 1 which is connected, for example welded, adhesively bonded or otherwise fastened, fixedly to the bottom 29 of the associated tank 66. The tank connection element 2 of the filter cartridge 31 is inserted into this connecting socket 1. The filter-side tank connection element 2 can be seen more clearly in FIG. 4 and comprises a connection piece 4 which merges into the cartridge housing 36. In the design variant according to FIGS. 1 and 4, the water to be filtered passes via lateral slots 6 and subsequently via passage ports 34 arranged on the cartridge bottom side into the interior of the cartridge housing 36 and thereafter passes through a filter bed, not illustrated in any more detail. The filter zone may in this case be formed in the up flow, in the down flow or in combination with both flow routings. The filtered water ultimately passes through the central outflow pipe 35 via the tank-side appliance connection 68 on the tank 66 (FIG. 1) and into the suction connection 67 of the water tank 66.

Details essential to the invention, then, are presented in more detail below with reference to FIGS. 1 and 2. So that, if appropriate, an adaptation to specific applications and/or the quality of the water to be filtered or of the filtered water which has run through the filter is achieved according to the invention by the provision of a blending device 60, 65 (FIG. 5); 136.1 (FIG. 9), 160 (FIG. 8), 165 FIG. 12); 336.1 (FIGS. 16-20), 360 (FIGS. 16-20), and 365 (FIG. 15). Thereby, for example, unfiltered and/or otherwise treated water can be admixed to the filtered water stream emerging from the filter 31. This may be expedient, for example, when the filter has a better filter action than is required for a satisfactory operation of the appliance operated with this tank or if, for example, the water introduced into the tank has a very good quality.

So that a fine tuning to specific applications and/or specific water qualities for operating the appliance can be carried out, it is proposed, in a further advantageous way, to design the blending device so as to be adjustable or settable in such a way that it is possible to influence the effective cross section of the bypass stream which, unfiltered and/or otherwise treated, is admixed to the filtered water stream. For this purpose, in FIG. 1, elements 6, 60 and 65 of the blending device are oriented with respect to one another in the connecting region of the tank/filter connection 1, 2 such that they form a liquid-conducting duct, and such that a direct throughflow of fresh water located in the tank 66 into the central outflow region of the suction connection 67 is possible.

The relevant filter-side blending elements of the tank connection in one embodiment of the invention are illustrated in FIG. 4 as slots 6 formed in the housing wall 36 and as passages 60 formed in an angular shaped seal 32 illustrated here by way of example as a hexagon.

To implement a possibility of setting the effective blending cross section, three clearances 60 of different size are illustrated here as fresh water throughflow ports. The remaining three of the total of six circumferential surfaces of the polygonal shaped seal 32 designed as a hexagon have, by contrast, here again by way of example, no clearances 60. Consequently, for example, what is known as an angle-dependent bypass control can be implemented correspondingly to the orientation of the cartridge when the latter is being inserted into the tank. Depending on the angular position in which the filter cartridge is inserted, a correspondingly large actively effective bypass cross section can be set. According to the illustration in FIG. 4, the three passage ports 60 differing in size and position can thereby release or conceal various bypass ports 65 in the tank-side filter connection piece 23 (FIG. 2) in order to set the blending ratio.

Again by way of example, for this purpose, FIG. 2 depicts two bypass ports 65 in a side wall of the connecting socket 23 which are of different sizes in their effective passage cross section and which are released or closed, depending on the overlapping of one of the three clearances 60 described with regard to FIG. 4. The blend setting described here is merely by way of example and may perfectly well be dimensioned with finer grading by a combination with further clearances 60 and/or bypass ports 65 in the same and/or further side walls of the polygonal tank-side and filter-side connection elements 1, 2 likewise illustrated here by way of example as a hexagon.

Further possible embodiments with regard to a blending device or a blend setting are also explained below with reference to further exemplary embodiments.

Reference is firstly made, however, at this juncture, to a further aspect essential to the invention. To ensure that only filter cartridges 31 intended correctly for the respective application can be inserted into the water tank 66, the tank-side filter connection 1 has coding structures oriented axially with respect to a longitudinal axis 69 running through the tank/filter connection. These coding structures may be designed as axially oriented projections, such as are illustrated here by way of example by projections 87 to 95 or 99, as can be seen particularly well in FIG. 2. They may, however, also be designed in the form of axial recesses, such as are likewise illustrated here by way of example, and not conclusively, as recesses according to references 96 to 98 as illustrated in FIGS. 1-6.

These axially oriented coding structures of the tank-side filter connection 1 or of a correspondingly coded filter-side tank connection 2 are intended for ruling out manipulations due to filter cartridges not intended by the manufacturer for the use. Correspondingly complementary coding structures of projections and recesses on the tank-side and filter-side connections 1 and 2 can ensure that only filter cartridges intended for the respective application can be inserted operably into the water tank, if appropriate also using a corresponding intermediate piece, for example in the form of an adaptor, which must then, in turn, have the correspondingly complementary coding structure, so that the required key/lock combination can lead to a filter cartridge inserted operably into the tank.

The axial projections 87 to 95 and 99 illustrated by way of example serve for ensuring that only a filter-side tank connection of a filter cartridge corresponding to the hexagonal shape shown here in FIGS. 1 to 6 can be connected sealingly to the tank-side hexagonal filter connection 1. Another sealing possibility, in particular without a sealing element having complementary axially oriented coding structures formed on it, is therefore not possible. Here, in this example, sealing takes place at the sealing surface 24 formed on the tank-side connecting socket 23, in cooperation with the filter-side sealing surface 33 which is itself formed on the filter-side tank connection in the form of the shaped seal 32. The axial recess 96 between the tank-side connecting socket 23 and these at least partially surroundingly arranged axial projections 87 is designed to be so narrow that only a coding element in the form of a hexagonal axial projection, as is implemented by the shaped seal 32, can be inserted in a sealing and preferably also fixing way.

To prevent the situation where a filter-side tank connection not utilizing this axial recess 96 may be attached sealingly at the top to the tank-side filter connection 1, axial projections 90, 91 projecting on the end face are formed, for example, on the end-face top edge of the connecting socket 23. These prevent a seal from coming to bear sealingly without axial formed coding structures, here in the form of axial recesses, or else, if appropriate, axial projections, depending on how the ratio between the remaining surface of the end-face edge 71 and the axial projections 90 or 91 is selected. Instead of correspondingly axial projections 90, 91 being formed, in a modified embodiment a recess functioning axially may also be provided, so that, again, no sealing bearing contact is possible without a complementary axial projection. An illustration of this has, however, been dispensed with for the sake of clarity.

In order also within the tank-side connecting socket 23 to ensure that only seals with axially oriented structures for sealing off between the tank-side filter connection and a corresponding filter-side tank connection can be implemented, internal ribs 30, as they are known, are formed, which extend as far as or, if appropriate, even beyond the edge of the tank outlet port 67, here arranged centrally by way of example, as illustrated diagrammatically by way of example in the prolongation of reference symbol 91.

So that sealing with respect to the filter-side tank connection can also be prevented outside the axial recess 96 provided for receiving the filter-side connection piece 32 in the form of the shaped seal 32, further axial projections and recesses are also illustrated here, again by way of example and diagrammatically. In addition, particularly advantageously, these may also have fixing elements for the filter cartridge to be inserted or be designed as such. A corresponding axial projection fixing element in the form of a snap action element 37 is formed on the filter cartridge housing 36 and axial recesses 38 formed complementarily thereto on the tank-side filter receptacle are described. By means of a radially greater extent in the inner contact region of this connecting structure than comparatively in the outer contact region on the end face with respect to the tank-side connecting socket, these two elements may also constitute fixing elements which, when a certain pressure force is overcome during the plugging of the cartridge into the tank connection, slip one into the other by what is known as a snap effect, until the two end faces 39 and stop 40 rest against one another and the filter cartridge is secured.

A further possible axially oriented coding structure is shown, again diagrammatically and by way of example, by the projection/recess connection 98, 99 illustrated adjacently to this. For this purpose, on the inside of the outer shell 25, which is also characterized as an axial projection 92, a further axial projection 99 is illustrated, which on the filter cartridge 31 requires the presence of a correspondingly complementary axial recess 98 in order to allow the insertion of a corresponding cartridge.

The six outer shell elements 25 likewise illustrated here once again by way of example themselves constitute axial projections 92, the outside of which has additional axial projections 93, again to prevent sealing bearing contact.

On the bottom side, in the direction of the tank bottom 29, these axial projections also extend in the radial direction and are additionally identified by reference number 95. In spite of this radial extent, however, these are also axial coding structures which again reliably prevent a seal from coming to bear without axially coded structures. In a particularly preferred embodiment, such an axial projection structure, also designated, for example, as a bottom rib, may be formed at least on one side of the tank as far as the wall of the latter, in order reliably to prevent a bottom-side connecting seal without an axially oriented coding structure.

As already partially referred to above, individual or a plurality of elements illustrated here as axial projections, in particular the bottom ribs 27 and 95, may also be designed in a complementary structure as axial recesses, so that, once again, sealing without an axial coding structure can be prevented.

For the sake of simplicity, a tank-side appliance connection 68 is illustrated here merely by way of example as a connection piece of round shape. However, like the connecting socket 1 of the tank-side filter connection, the tank-side appliance connection 68 may also have coding structures, in order to ensure that only permissible connections can be made, that is to say both to a filter cartridge to be used for the tank and, if desired, to an appliance suitable for the use of this tank. For the sake of clarity, a graphic illustration of such details for the appliance connection 68 is dispensed with, and, with regard to the possible embodiments of codings for this purpose, reference is made to the embodiments described with regard to the tank/filter connection and which also have validity to the full extent for the tank/appliance connection.

A further and/or additionally possible embodiment of a tank-side filter cartridge coding is shown in FIGS. 2 and 5 as a tank-side filter connection element, the circumferential sealing surface 24 connects with a corresponding filter side sealing surface 33 which has a coding structure oriented axially with respect to the filter connection piece 4 which only for the purpose of illustration is disposed on a coding element having a polygonal cross section. In this special exemplary embodiment, the polygon is designed as a hexagon so as to represent a multiplicity of other possible embodiments of tank/filter connections having other non circular cross sections.

Further details of such a possible coding between a tank-side filter connection element 1 and a filter-side tank connection element 2 are again described below with reference to FIG. 2. The tank-side filter connection element 23, in this case designed by way of example as a hexagon, in the form of a connecting socket 23 is designed, to implement its polygonal contour, as an axial projection 23 with a polygonal outer circumference having a sealing surface 24 or with a correspondingly polygonal inner circumference. After the filter cartridge has been plugged on, the complementary cartridge connection structure bears preferably positively and sealingly, in a first possible fastening form, with its inner circumference and sealing surface 33 (FIG. 4) against the outer circumference sealing surface 24 so as to fix and seal off the filter cartridge 31.

Preferably, in this case, the tank-side filter connecting socket 23 and the connection piece 4 of the filter cartridge may at least partially surround one another. If surrounding is complete, this ensures, in addition to the additionally stabilizing effect of the peripheral contact surfaces between these two axially structured elements, a satisfactory large-area sealing off between the fresh water side inside the tank 66 and that side of the filter device which is located at the connecting port 35, so as to supply the appliance via the suction connection 67.

In a complementary embodiment according to FIG. 6, conversely to this type of set-up, the tank-side filter connection element 23 may be designed as a complementary structure in the form of an axial recess with a corresponding inner circumference, against which, in turn, the sealing surface 33 of the filter cartridge can come to bear preferably positively and sealingly over a large area, this at the same time ensuring once again a sufficient fixing of the filter cartridge 31 to the tank 66.

Again with reference to FIG. 2, then, further details of the coding of the tank/filter connection for the embodiment designed as an axial projection or projections on tank connection element 23 are described. However, these versions also apply accordingly to a filter connection in the form of the above-described axial recess in tank connection element 23 according to FIG. 6. In view of this relationship, the same reference symbols are therefore also used in both embodiments for the appropriately identical features in each case.

The tank-side connecting socket 23 (FIG. 2) has a hexagonal outer contour, the circumferential outer surface of which forms a sealing surface 24. Around the socket 23 on the outside are arranged outer shells 25 which point in the direction of a filter cartridge 31 to be inserted and are oriented approximately parallel to a longitudinal axis 69 running through the connection and which are suitable for at least partially surrounding a filter cartridge housing or its connection region from outside.

In the interspace 70 between the connecting socket 23 and the outer shells 25, blocking elements 26 are mounted, which ensure that only a narrow seal fitting onto the sealing surface 24 can be introduced into the region of the connecting socket 23.

As already partially described, bottom ribs 27, 28 prevent sealing with respect to the tank bottom 29, and inner ribs 30 prevent sealing by means of an inner radial seal. The bottom ribs are preferably arranged radially and/or tangentially near the bottom with respect to the connection piece 23. The inner ribs 30 project inward and/or upward beyond an upper edge 71 of the connecting socket 23. As a result of these structures, only the sealing surface 24 is accessible as a sealing surface, so that, owing to the hexagonal outer contour, illustrated here by way of example, of the sealing surface 24, a coding structure according to the invention is obtained.

The inserted filter cartridge 31 is provided with a shaped seal 32 which likewise correspondingly has a hexagonal cross section (cf. FIG. 3). The inner surface of the shaped seal 32 in this case forms the sealing surface 33.

Furthermore, the inlet slots 34 for supplying water into the filter cartridge and a central outflow port 35 for the water discharge can be seen in FIG. 3. An illustration of bypass ports in the shaped seal 32 was dispensed with here for the sake of clarity, with reference to FIG. 4.

Via the shaped seal 32 with correspondingly shaped connecting socket 23, the embodiment illustrated also comprises further coding structures. Thus, snap elements 37 (cf. FIG. 4) are shaped on the outside of the filter cartridge housing 36. The snap elements 37 can be introduced into corresponding receptacles 38 of the outer shells 25. When the lower edge 39 comes into place against the stop 40 of the receptacles 38, a pressure point is obtained. The filter cartridge 31 can easily be put in the correct angular placing into this position without any opposing resistance. In this angular placing, the shaped seal 32 is oriented with respect to the sealing surface 24 of the connecting socket 23, so that it can be introduced further on in the axial direction. By being pressed in further in the axial direction, the snap element 37 snaps over the stop 40, the shaped seal 32 being pressed in along the sealing surface 24. By means of the slope of the snap elements 37 and the corresponding inner shape of the outer shells 25, the filter cartridge 31 is fixed in the outer shells 25. Further axial fixing elements are no longer required in this embodiment.

FIG. 5 shows a further embodiment according to the invention, illustrated diagrammatically, with a blending quantity which can be set as a function of the angle. The tank bottom 52 is illustrated merely in cutout form in the connection region of the filter cartridge 53. The tank bottom 52 comprises a hexagonal connecting socket 54 which converges slightly upward in a manner of a pyramid frustum, as compared with a purely vertical orientation of the socket walls and/or as a further coding structure, in order to improve the sealing action. This cross-sectional taper can scarcely be seen in the perspective illustration.

The outer surfaces 55 of the connecting socket serve at the same time as a sealing surface, in order, when the filter cartridge 53 is put in place, to seal off the outflow line 56 completely or partially with respect to the interior of the tank.

The filter cartridge 53 has a hexagonal seal 57 coded so as to match with the connecting socket 54. The individual walls 58, with the exception of a wall 59, are designed with the same length in the axial direction A. The wall 59 is provided with an underside clearance 60, the function of which is explained in more detail below. The outlet 61 from the filter cartridge 53, through which the filtered water passes into the outflow line 56, can be seen inside the seal 57.

Various socket walls 62, 63, 64 of the connecting socket 54 are provided with a different number of bypass ports 65. The bypass ports 65 are arranged such that they are closed sealingly by the seal walls 58 of longer design when the filter cartridge 53 is plugged on. The bypass ports 65 can remain open only where the wall 59 with the clearance 60 is used, so that water filtered via the clearance 60 passes directly out of the tank to the region of the outflow line 56.

As can easily be seen from the exemplary embodiment illustrated, the size of the free cross section of the bypass ports 65 is set by means of the angular arrangement of the filter cartridge, that is to say by the selection of the socket wall 62, 63, 64 to which the clearance 60 is attached.

In the present embodiment, the cross-sectional openings of the plurality of mounted bypass ports 65 are added up. In other embodiments, simply bypass ports 65 of different size may also be provided. The different cross sections of individual bypass ports 65 or in the sum of a plurality of bypass ports 65 on a socket wall, for example the socket wall 64, give different fractions of unfiltered water which are admixed to filtered water. A blend setting is thus obtained which is dependent on the angular position of the filter cartridge 53.

A further possible embodiment of a blend setting may be implemented, for example, by the design of a driver element, actuable by the filter cartridge, in the form of a connecting socket 54.1 adjustable rotatably in its position, according to the illustration in FIG. 5*a*. The bottom 54.2 of the rotatable connecting socket 54.1 here has, by way of example, three bypass ports 65.1 adjacent to the outflow line 56 as illustrated in FIG. 5*a* and, depending on the rotary position with respect to the tank bottom 52, may be arranged such that complementary bypass ports 65.2 arranged in the tank bottom 52 are released in a fluid-conducting manner or are closed.

This illustration illustrates purely by way of example four different settings, the rotary position shown with closed bypass and three further positioning possibilities, in each case with the release of one, two or all three bypass holes 65.1 by their coincidence in position with the corresponding bypass holes 65.2. A possible separation variant between the bypass holes 65.1, connected to the tank-side fresh water connection, and the centrally arranged outflow line 56 would be the arrangement of an intermediate seal, in particular and preferably an axial seal, which extends sealingly between the end face of the filter-side tank connection element and the bottom 54.2 of the connecting socket 54.1. However, other, if appropriate also additional separating and/or sealing elements between the fresh water side and the side of the filtered water may perfectly well be envisaged.

In addition to the embodiments illustrated, further embodiments and/or combinations with this embodiment may also readily be envisaged. Thus, for example, the hitherto described coding structures in the form of hexagonal polygons, illustrated by way of example, may be supplemented and/or combined by or with other coding structures, again, for example, in the form of square polygons, as is additionally shown by way of example by an embodiment of FIG. 6.

Finally, FIG. 6 shows, in addition to a socket/filter connection, described in comparison with the embodiments in FIGS. 1 to 4, in the form of an axial projection 23 on the tank-side filter connection element 23, a complementary form as an axial recess 23 which is formed in the tank bottom 29 and in which all the coding possibilities described with respect to the first embodiment can also be implemented here accordingly, specifically either identically and/or complementarily or in combined embodiments.

FIG. 6 shows as a second essential feature the possibility of the use of adaptors 85, 86. The adaptor is illustrated purely by way of example for connecting a filter cartridge 73, likewise illustrated by way of example, to a tank-side filter connection 1, while, as already stated above, the embodiment of the filter connection 1, in particular of its socket 23, may be implemented both as an axially projecting socket and as a groove of axially sunken design. The same applies accordingly to the tank-side appliance connection on the underside of the tank bottom 29. On account of the accordingly identical functionalities, the individual elements are also given the same numberings as are already partially used above in the description. For the sake of clarity, an illustration of details of the blending device has been dispensed with, with reference to the examples in FIGS. 5 and 5*a*, although here, too, such versions are possible in a corresponding way.

The design variants illustrated also show the most diverse possible coding structures which are to be provided according to the invention. In any event, it is ensured that only correspondingly adapted filter cartridges with a key function fit into the corresponding tank-side filter connections.

Further possible embodiments are also described below with reference to FIGS. 1 to 20. FIGS. 7 to 14 describe a tank/filter cartridge connection with blend setting elements 106 (FIG. 8), 136.1 (FIG. 11), 160 and 165 (FIG. 13, 14) and with enciphering or coding structures oriented axially with respect to a longitudinal axis of the connection, in combination with a further embodiment of a form-fit seal. For the sake of simplicity, features already corresponding to the embodiments described above are designated by the same basic numbering, but increased by the number 100.

Figure 7:
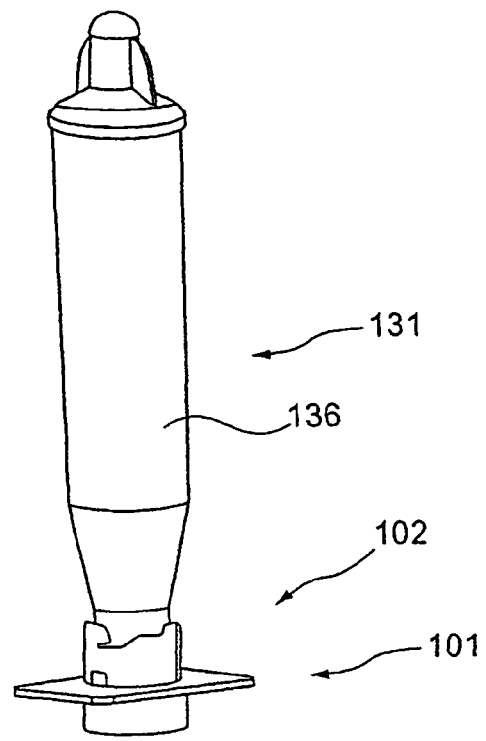
Figure 8:
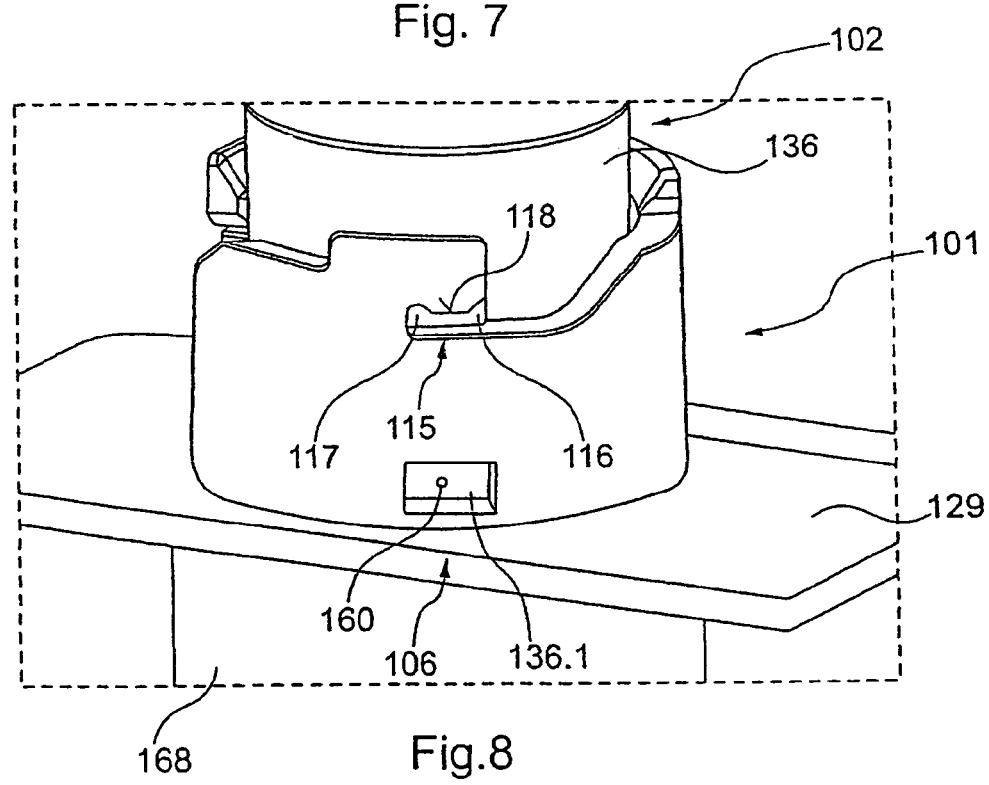

Accordingly, FIG. 7 shows a tank-side connection piece 104 in which a filter cartridge 131 is connected via a filter-side tank connection piece 101. According to FIG. 8, the housing 136 of the filter cartridge 131 is plugged completely in the tank-side connection piece 101. The end face of the cartridge housing 136 is illustrated in FIG. 8 behind a passage slot 106 for the inflow of the fresh water located in the tank into the inner region of the connection piece 101. Illustrated centrally in this visible portion of the filter cartridge housing 136 is a clearance 160 in the form of a bore which performs the function of a blending element and causes fresh water to flow through it and through a further port 165, FIG. 10, arranged behind it into the filter outlet region 135 (FIG. 13) in which the water filtered by the cartridge is conducted into the tank outlet 168 (FIG. 14). The blend setting may here, too, be varied, for example, via corresponding rotary positions, insofar as a version with an adjustable effective blending cross section is provided. In a simple version, as illustrated, a fixed blend setting is also possible, which, for example, is independent of a rotary position.

As one of several possible fixings of the filter cartridge 131 to the tank-side connection piece 101, illustrated on the latter is a receptacle guide track 115 for receiving a radial projection 116 formed on the filter cartridge. Both have a latching element 117 and 118 in each case complementary to the other, which latching elements, after a corresponding rotational movement during the insertion of the filter-side tank connection element 102, latch snappingly one into the other after corresponding tension forces of the part projecting approximately in the manner of a wing from the tank-side connection piece have been overcome. Since the latching element 117 has in its front region a thickening, with respect to a rotational movement required for the insertion of the filter cartridge, which thickening has opposite it a correspondingly large cut-out region in the latching element 118, a position-securing latching of the two connection elements with one another can consequently be ensured.

Figure 9:
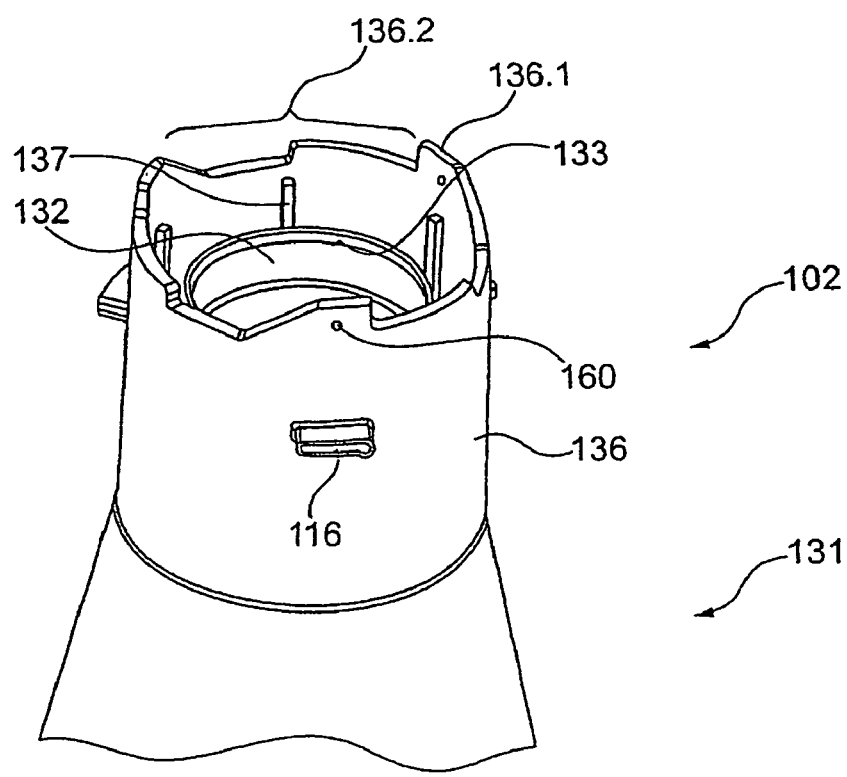

FIG. 9 illustrates the filter-side tank connection region in the filter cartridge 131, the housing 136 having in the front end-face region a projection 136.1 projecting with respect to clearances 136.2, and in each case comprising as blending element the passage port 160 already described above. The projections 136.1 of the filter cartridge housing 136, in turn, constitute axially oriented coding structures which allow an operational use of the filter cartridge in the respective tank connection element. As soon as one of these axial coding or enciphering elements in the form of the housing projections 136.1 is absent, the fresh water located in the tank flows directly through the passage port 106 of a correspondingly large cross section and the further bypass port 165, lying behind it and likewise having a correspondingly large cross section, directly into the appliance intake region 168.

Figure 10:
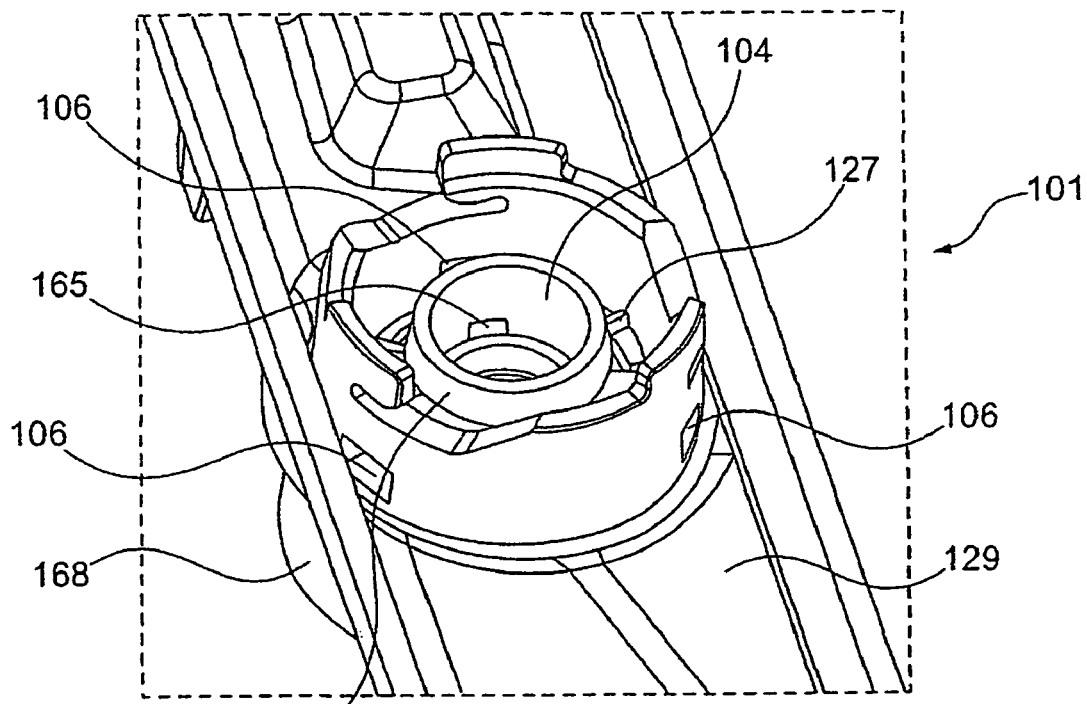

A filter cartridge possibly inserted, without corresponding axially projecting housing wings 136.1, would in this case be without a filter action on account of the large throughflow of fresh water into the inflow region of the appliance connection, as can be seen clearly from FIG. 10.

The embodiment described here has in each case three axially oriented coding structures 136.1 on the filter housing 136 which are arranged, in particular, preferably offset at 120°, on the end face of the circumference of the filter-side tank connection element 102, as may be gathered clearly from FIG. 9. The complementary connection elements of the tank-side filter connection 101 are shown in FIG. 10.

Figure 11:
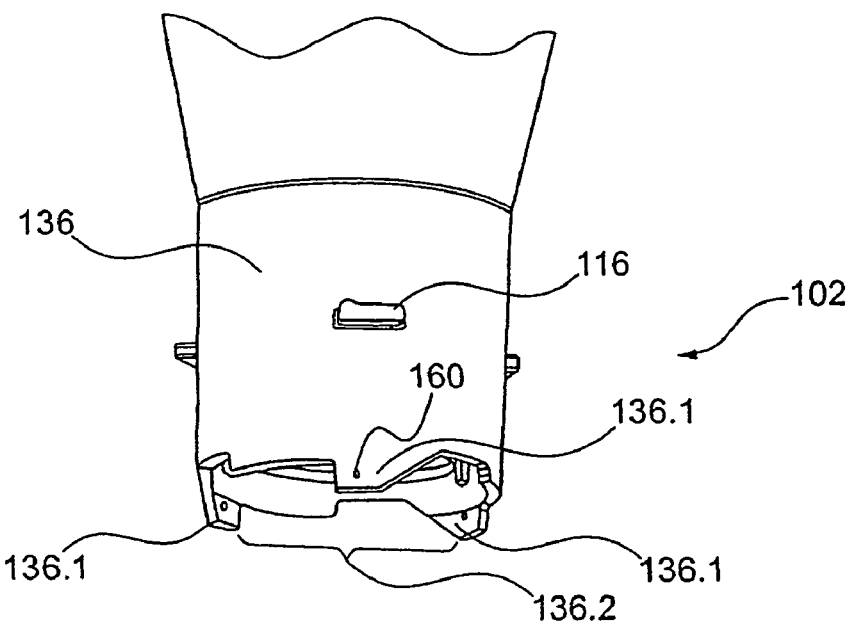
Figure 12:
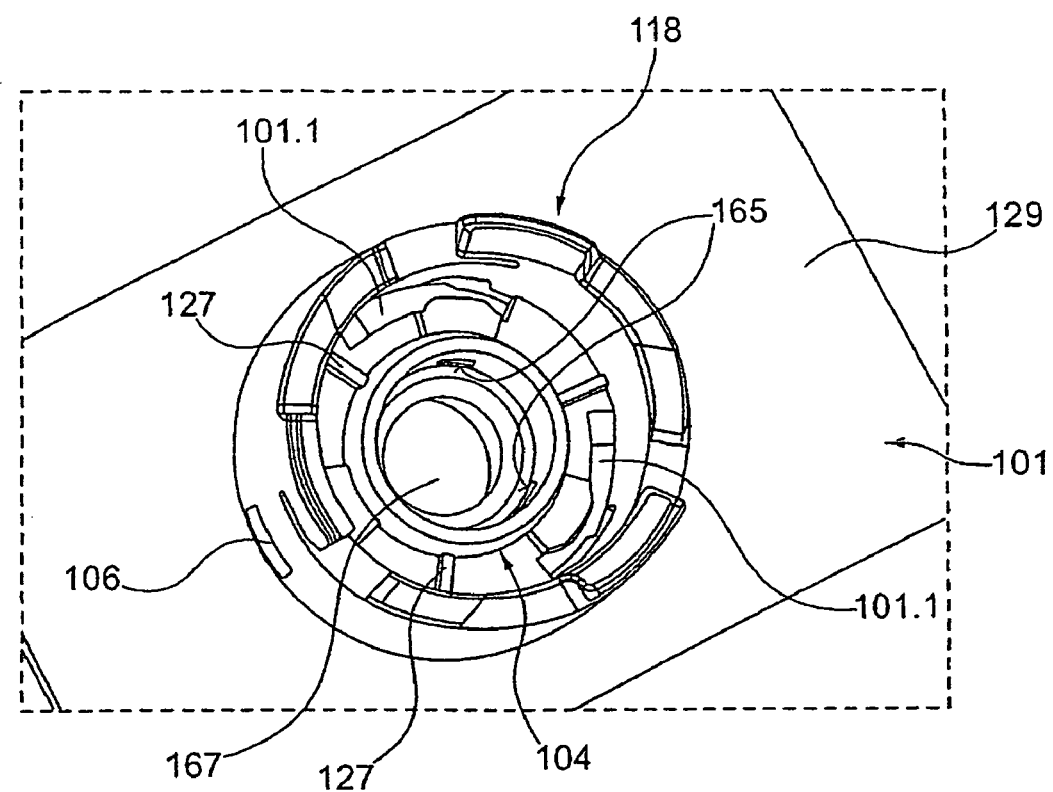

FIGS. 11 and 12 show two further views of this embodiment of a tank/filter connection 101, 102. In this case, on the tank-side filter connection 101, three axial recesses 101.1 only two of which are illustrated, are sunken, in the tank bottom 129, so that the three complementary housing projections 136.1 of the filter cartridge can be received. Here, therefore, once again, axial projections 136.1 or complementary axial recesses 101.1 are illustrated, as an enciphering or coding structure for preventing filter cartridges not provided for the intended use.

Figure 13:
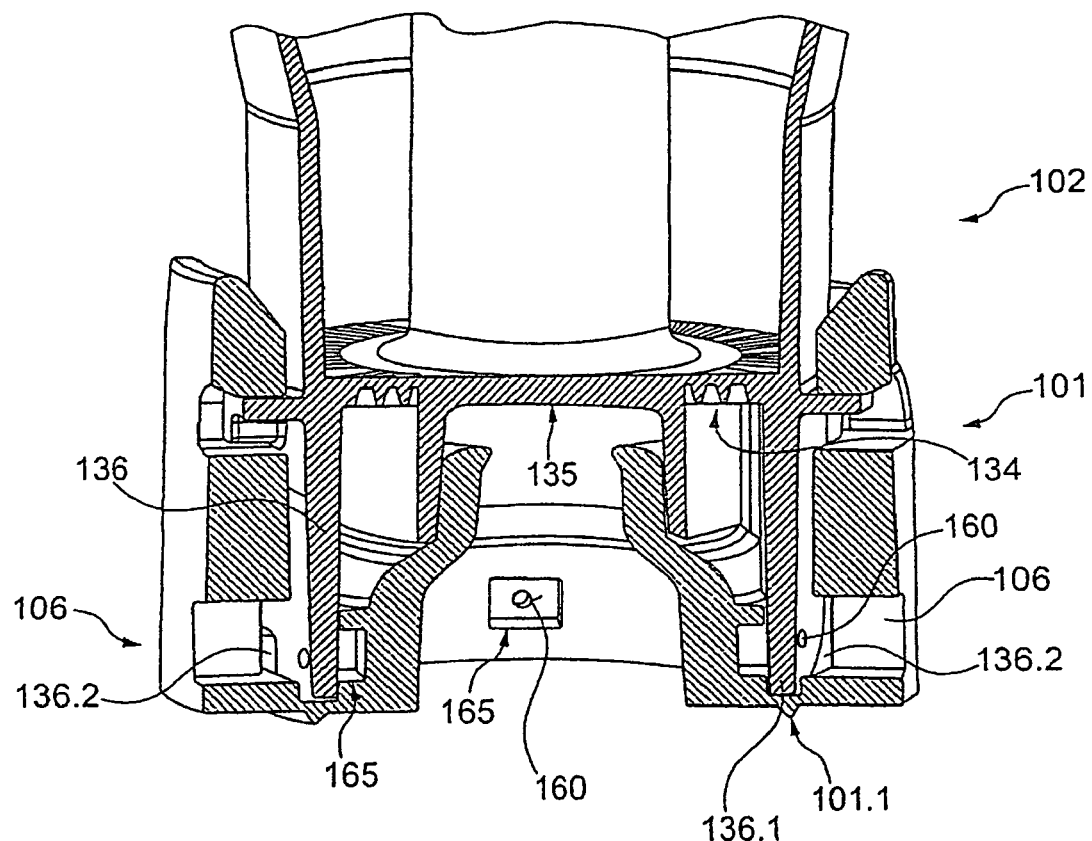
Figure 14:
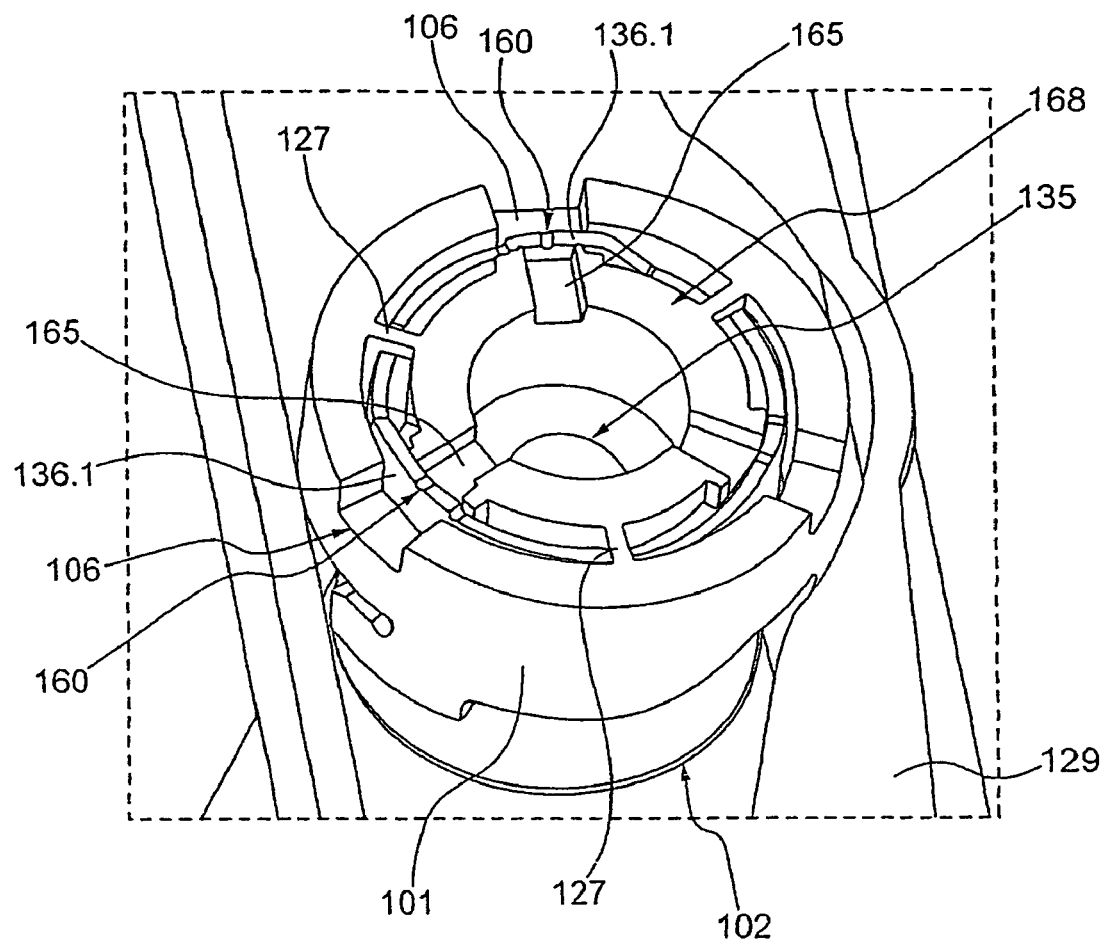
Figure 38:
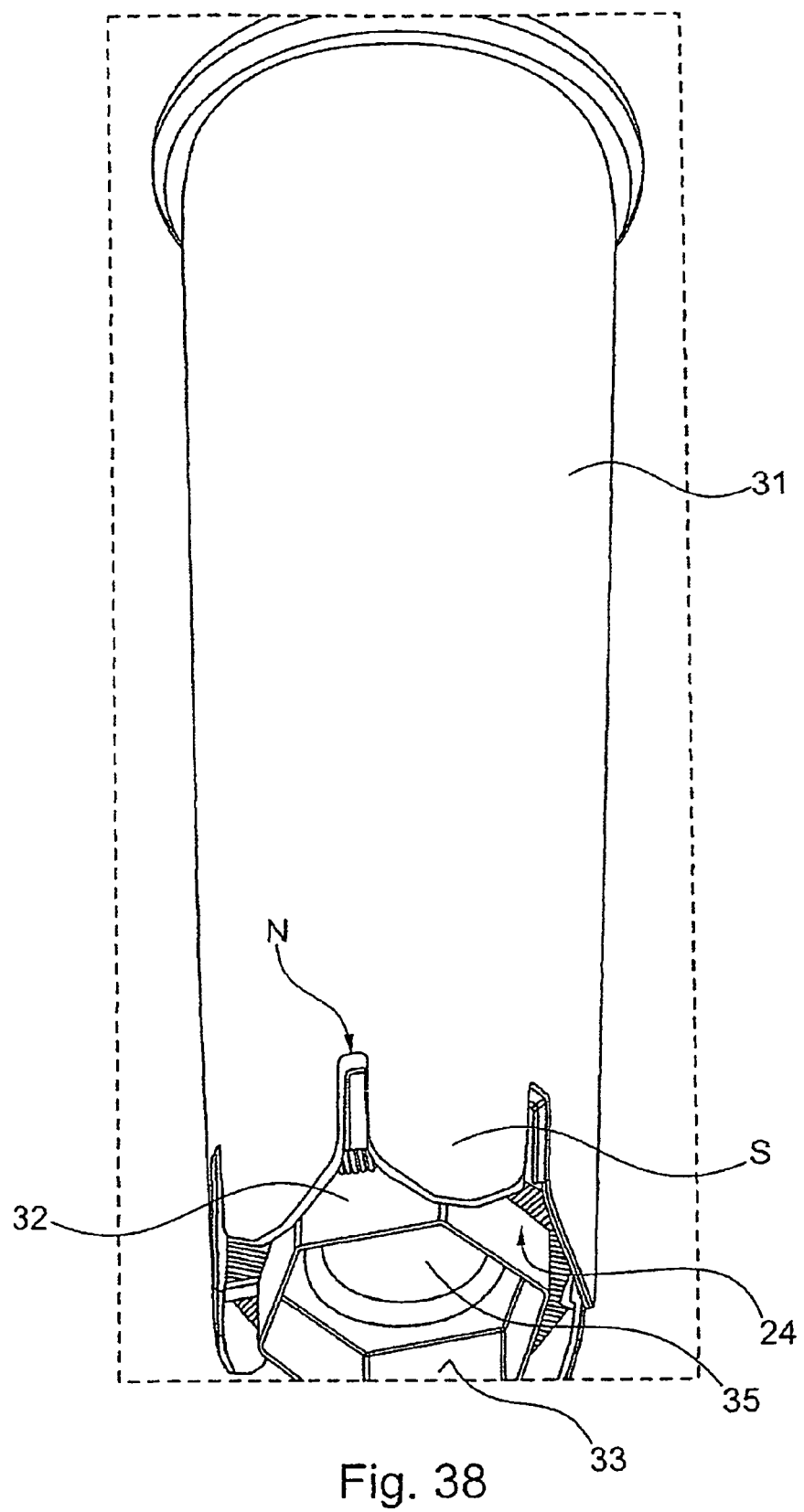

FIG. 13 shows a section through a tank-side filter connection element 101 in which a filter-side tank connection element 102 is inserted. In this case, in the lower bottom-side region of the tank-side filter connection element 101, the bypass or short-circuit ports 165, essentially closed by the three housing projections 136.1, can be seen. With the filter cartridge inserted, the bypass function is implemented, so that a specific quantity of fresh water is admixed to the filter water filtered by the filter cartridge and emerging through the outlet 135. In the absence of a cartridge, this axial coding structure is ineffective or this tank-side filter connection can be used only for the unfiltered conduction of the fresh water located in the tank.

With the cartridge inserted, fresh water entering through the slot 106 by way of the clearances 136.2 can rise inside the connection piece 104 and pass through the inlet slits 134 into the filter chamber of the filter cartridge, flow through the filter and be transferred out of the filter outlet port 135 into the intake line of the tank or of the appliance.

FIG. 14 shows a further sectional view through the tank bottom 129 and a tank-side filter connection 101 connected to it and also a filter-side tank connection 102 inserted therein, as seen from the bottom side of the tank. In this, the bypass or short-circuit lines 106 and 165 can be seen very clearly, which show a corresponding conduction of the unfiltered fresh water into the tank outflow region 168. With a cartridge having the correct axial coding being inserted, as in the example shown, a correspondingly provided blending of the fresh water to be filtered takes place by means of the bypass holes 160 formed in the housing portions 136.1 projecting in the manner of a wing.

Instead of the three axial coding structures offset at 120°, shown here by way of example, four, five or, for example, six such structures may be formed. The spacing of the individual complementary axial coding structures may in this case be designed either symmetrically or else asymmetrically.

FIGS. 15 to 20 show further embodiments of tank-side filter connection elements and filter-side tank connection elements which have essentially already been described, with blending structures 306, 336.1 and 365 of a blending device in which the foregoing reference numbers 0 to 99 and 100 and upward have been used. Accordingly, for the sake of simplicity, here, too, features already described with respect to the embodiments described above are designated by the same basic numbering, but increased here by the number 300. They, too, have axially coded connecting structures, in which, for example as seen over the circumference, axial coding structures 336.1, 336.2 and 337 (FIGS. 16, 18 and 20) for the filter-side tank connections illustrated in each case are formed, which, to differentiate them from one another which in each case are arranged in different angular placings with respect to one another. The tank-side filter connections 301 show the complementary axially coded connecting structures of the respectively associated tank-side filter connection elements as further possible embodiments of different coding structures.

FIGS. 21 to 32 show further possible embodiments of enciphering and/or fixing structures for tank/filter connection elements. In this case, FIGS. 21 to 24 show a first embodiment, FIGS. 25 to 28 a second embodiment and FIGS. 29 to 30 a third possible embodiment of bayonet connections, in particular double or multiple bayonet connections, as an addition to the embodiments already presented in FIGS. 7 to 20.

The essence of the embodiments of FIGS. 21 to 32 is in this case the illustration of different possible codings in the form of double or multiple bayonet connections or key codings in the form of key/lock functions. FIGS. 21 and 22 show the filter-side tank connection coding or fixing structure with, in a top view according to FIG. 22, eight projections 21.1 and 21.2 which, according to FIG. 21, are formed along the longitudinal extent of the filter-side tank connection element both axially and so as to be offset in a radial angular position with respect to one another as two pairs of four.

The complementary connecting or coding structures or rib 327 and port 20 are shown in the tank-side filter connection element 19 in FIGS. 23 and 24. In this embodiment, according to FIG. 24, an angle α between an axis of a depicted x-y coordinate system and an axis running through the port 20 is illustrated as a comparatively acute angle α. To allow a fixing of the filter-side tank connection element 8 to the tank-side filter connection element 19, the coding projections 21.1 arranged foremost on the end face must be arranged so as to be distributed according to the peripheral distribution of the ports 20 on the tank-side filter connection element 19, so that it becomes possible for the filter-side tank connection element to be pushed in axially. After the first push-in depth with respect to the coding projections 21.1 has been overcome, a rotation about a longitudinal axis running through the filter-side tank connection element must take place, until the second set of coding projections 21.2 comes into coincidence with the ports 20 and allows a further axial introduction of the filter-side tank element into the tank-side filter element, up to fixing after a further rotational movement about the longitudinal axis through the filter-side tank connection element.

FIGS. 25 to 28 illustrate similar embodiments, but with contours, modified with respect to the embodiments 21 to 24, of the ports 20 and of the coding projections complementary thereto, and also with orientations modified axially and angularly, as seen in the top view.

A further difference is also in the number of respective coding structures. In the embodiments in FIGS. 21 to 24, overall, there are eight on two planes, and in the embodiments 25 to 28, there are in each case only six as two triple-coded projection planes. These coding structures described here, too, may readily be combined with other, for example axially oriented coding structures, in order to allow even further differentiation possibilities for individual tank/filter connections.

Figure 39:
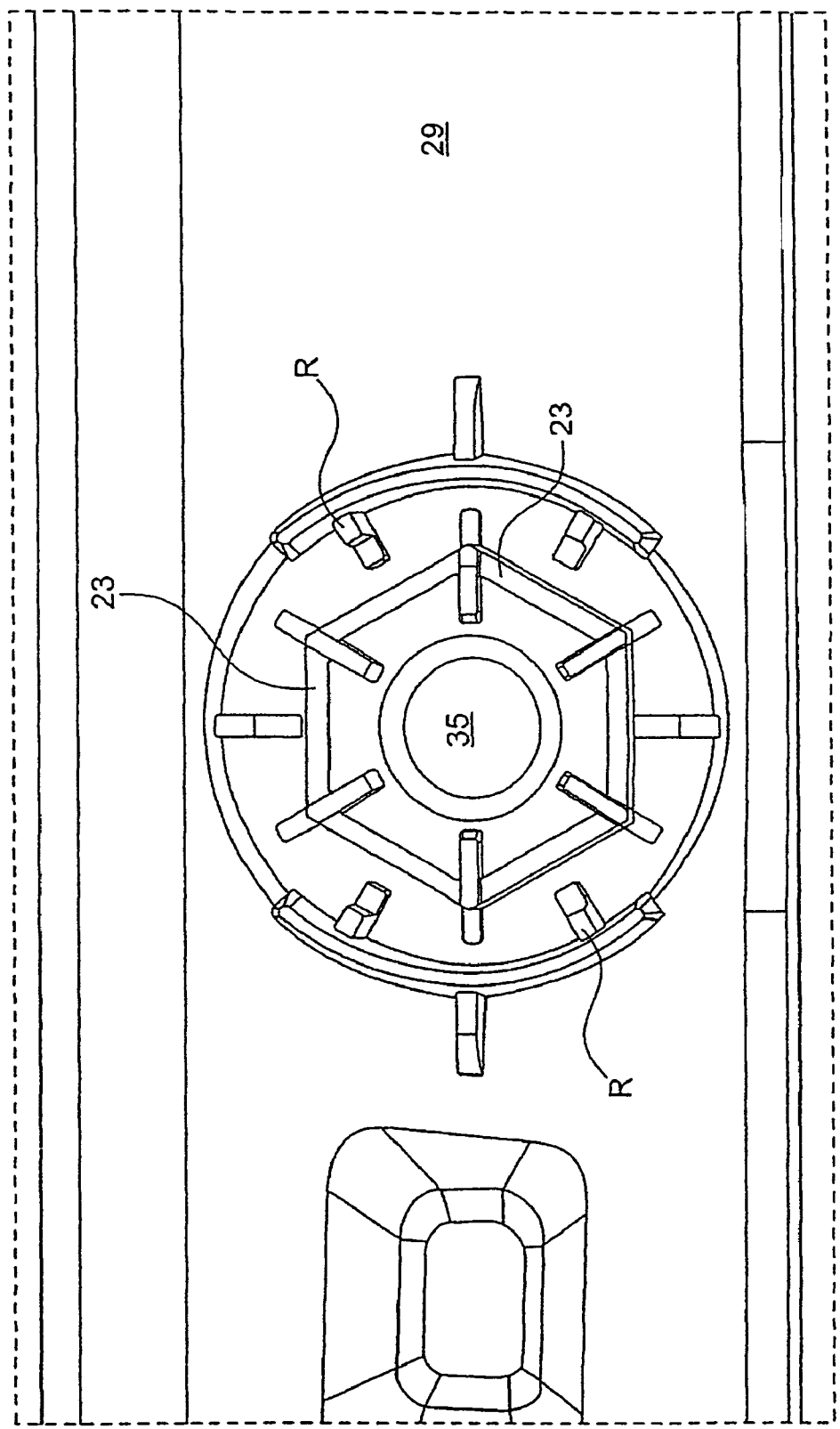
Figure 40:
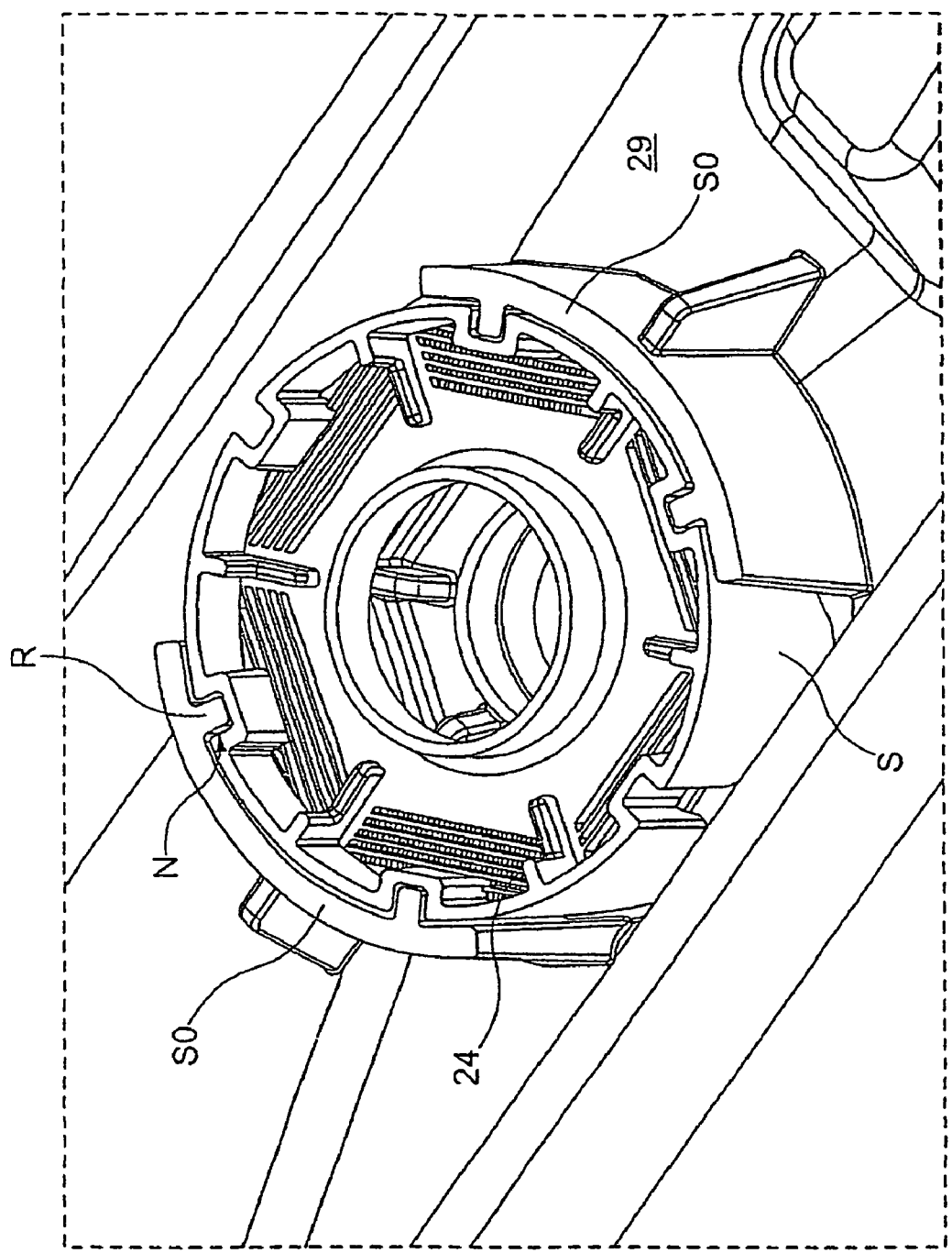

FIGS. 33 to 40 show a further embodiment of a tank/filter connection in different views and illustrations such as oblique top views, sectional illustrations, a front view and bottom view of the filter cartridge 31 and a top view of the tank-side filter connection element with and without an inserted filter-side tank connection element (FIGS. 39 and 40).

The essential features of the embodiment of a tank/filter connection are the approximately wedge-shaped tips S projecting on the end face from the filter cartridge 31 and the grooves N arranged between them. The geometric dimensions and angular positions of these tips S and grooves N with respect to one another again make it possible to have different codings or fixing points for the filter-side connection element on the tank-side filter connection element.

The tips may also serve for positioning during the insertion of the filter cartridge into the tank connection piece, in particular in the case of connections which cannot be seen visually, for example in order to avoid damage to the sealing and/or other structures.

Particularly suitable for coding are in this case the slot spacings and/or the slot widths and/or the widths of the tips or projecting wings and, likewise, their lengths and/or spacings which must match with corresponding structures on the tank-side filter connection element, in order to allow the use of an operationally permitted filter cartridge.

These matching coding and/or fixing structures are ribs R (FIG. 39) which are formed on the tank-side filter connection element and of which the cooperation with the coding and/or fixing structures N and S formed on the filter-side tank connection element can best be seen in FIG. 40. The ribs R are in this case formed on a wall-shaped socket SO partially surrounding the filter-side tank connection element.

The above-described coding and/or fixing structure may also be designed complementarily in a modified embodiment, that is to say grooves instead of ribs and ribs instead of grooves. In a further-modified embodiment, however, it is also perfectly possible to have a mixed or combined coding and/or fixing structure by grooves and ribs being formed on one and/or the other tank-side or filter-side connection element in each case.

Figure 41:
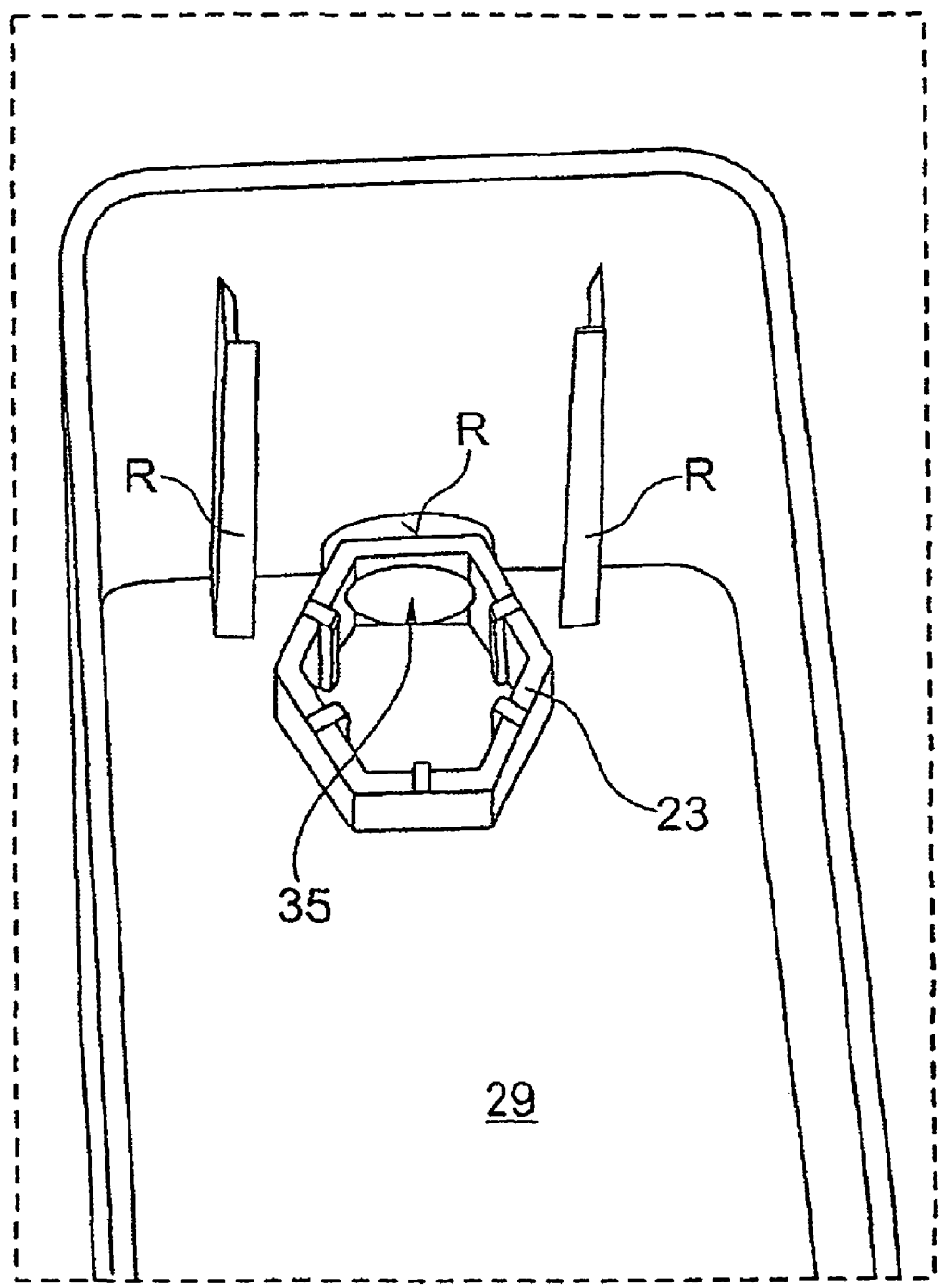
Figure 42:
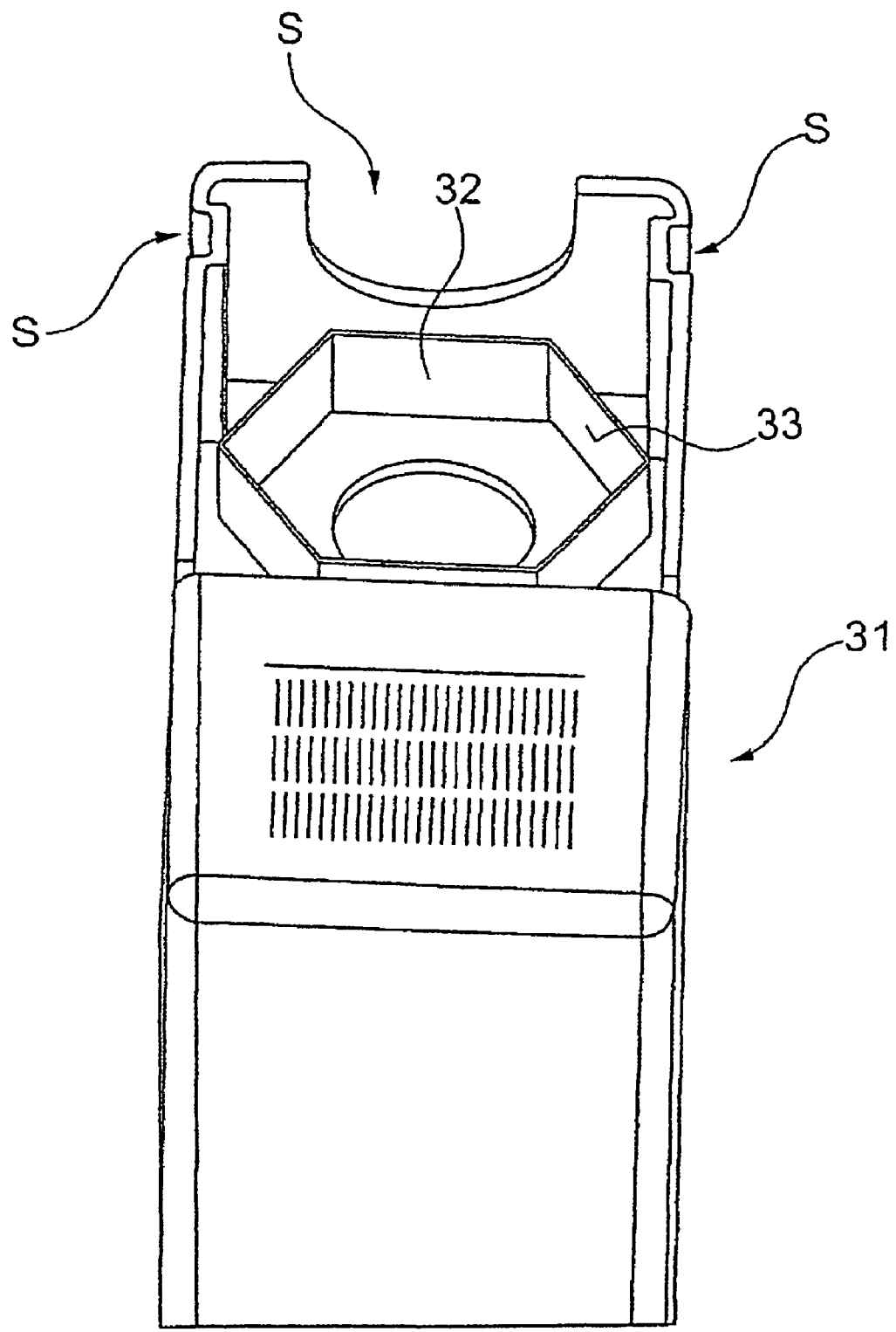
Figure 43:
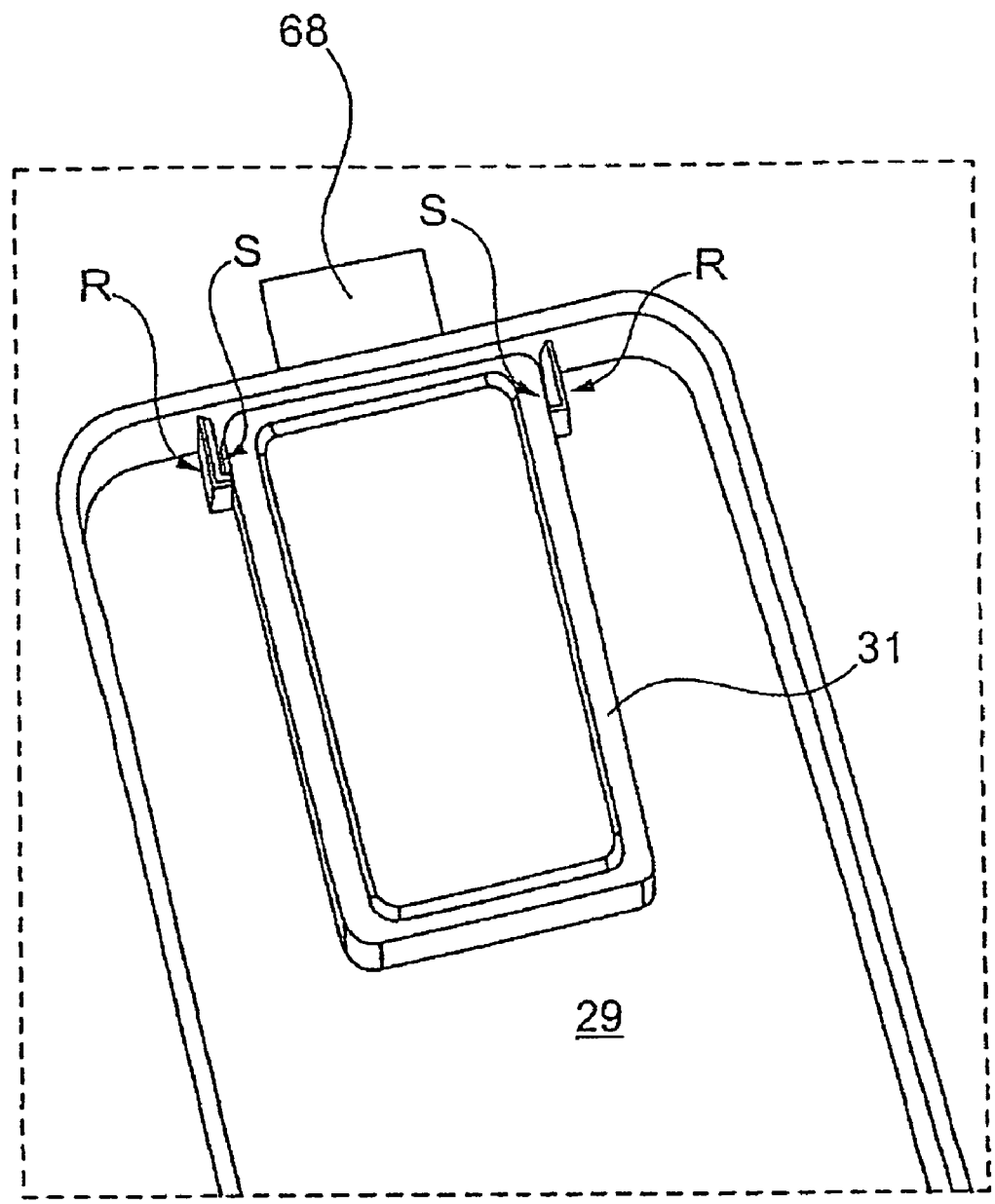
Figure 44:
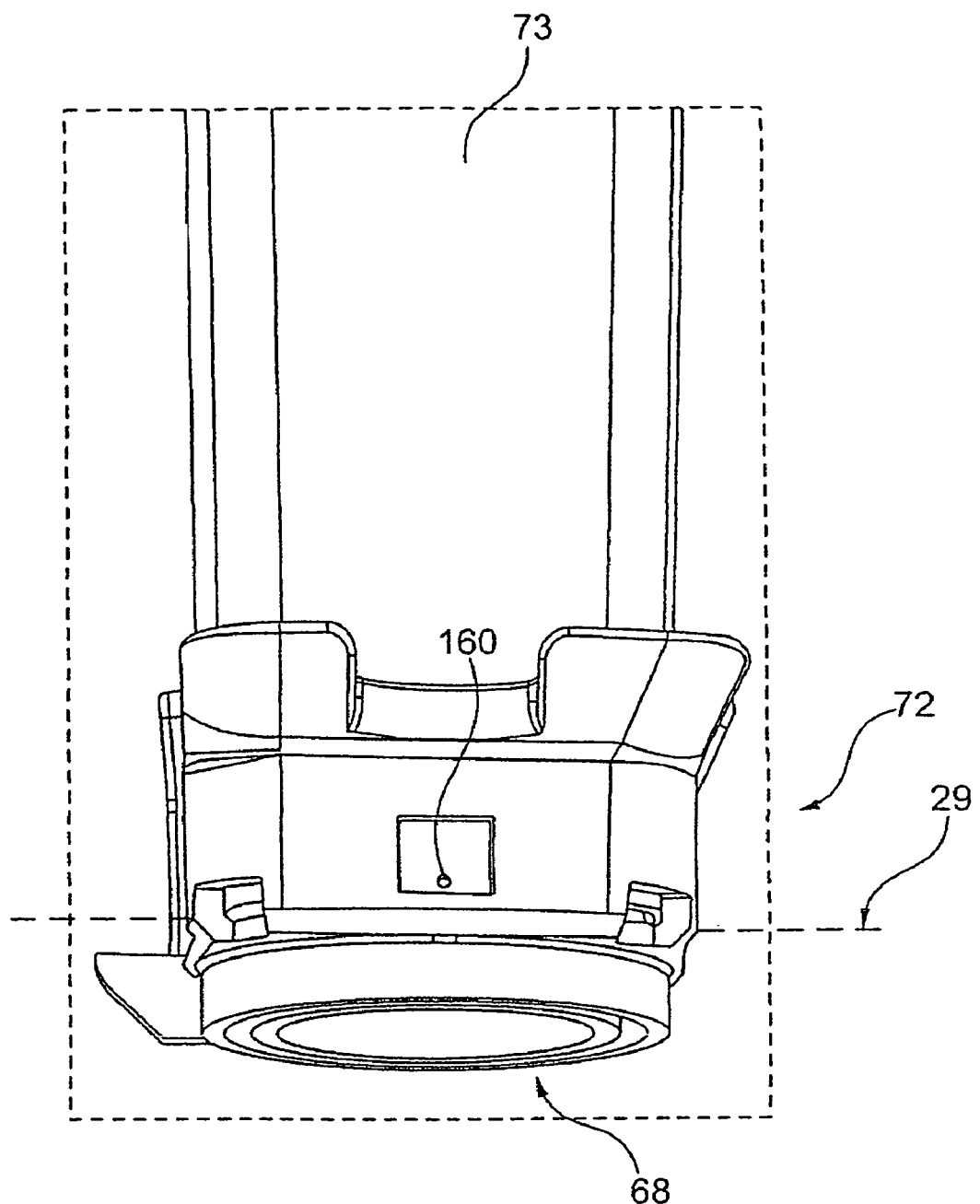
Figure 45:
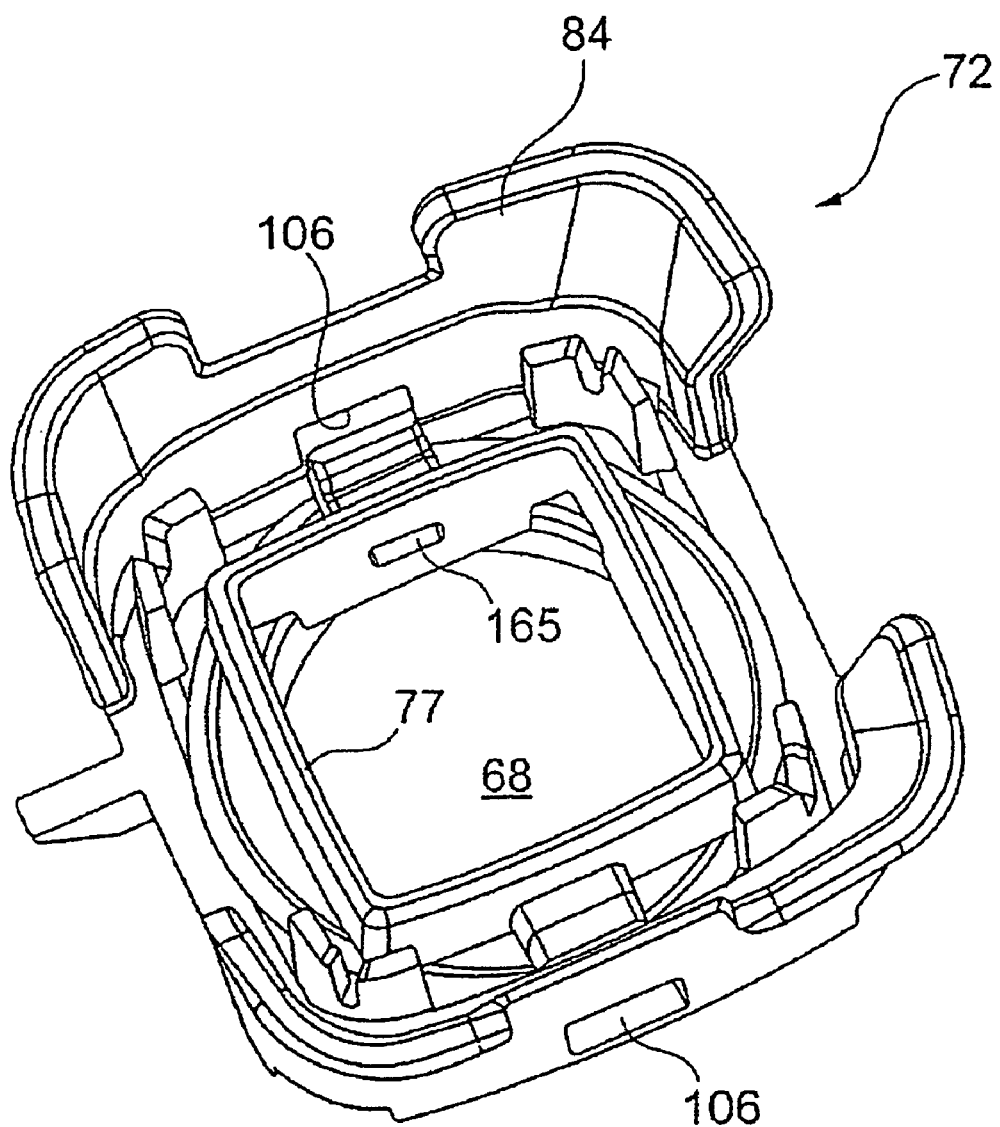
Figure 46:
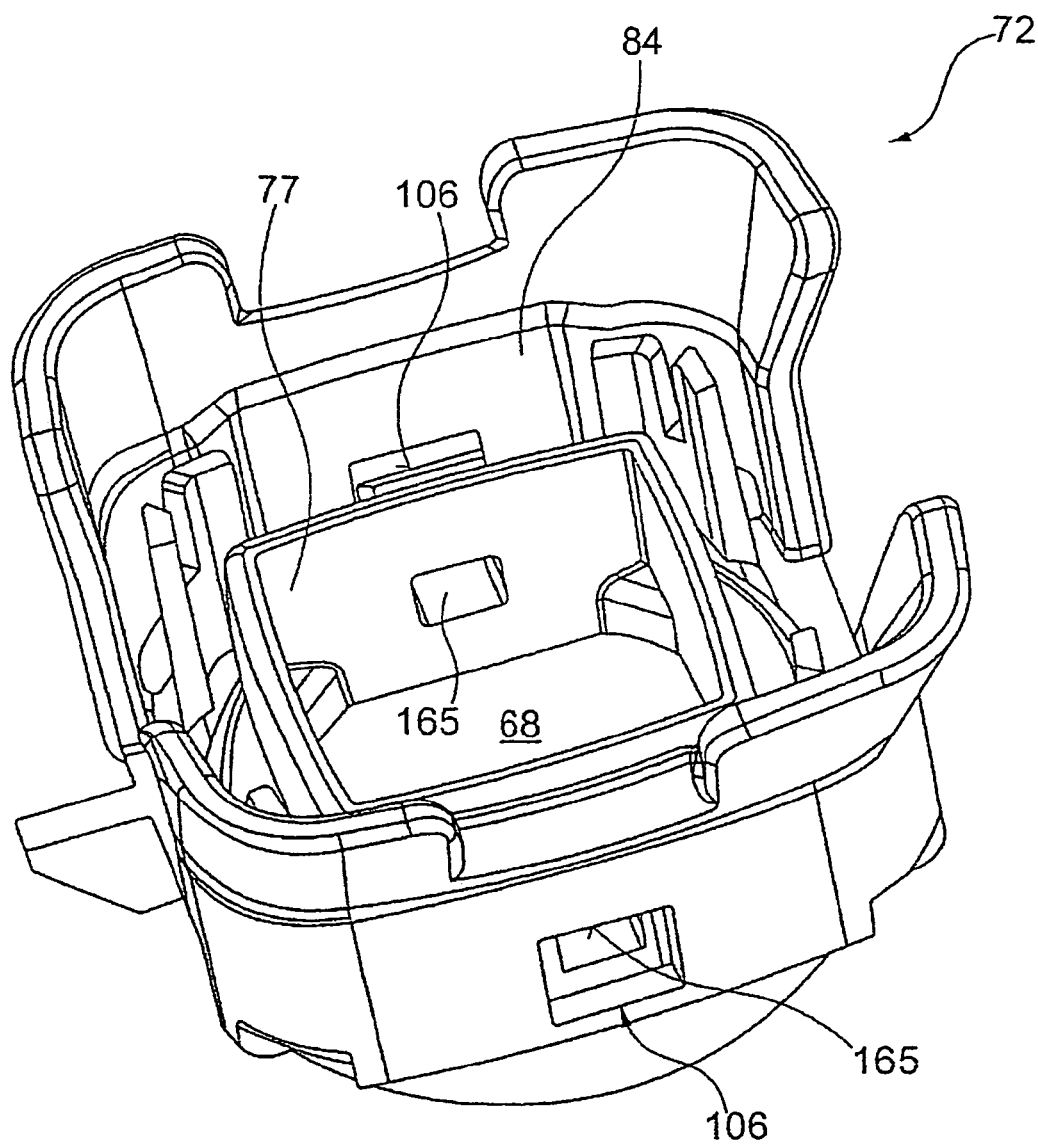
Figure 47:
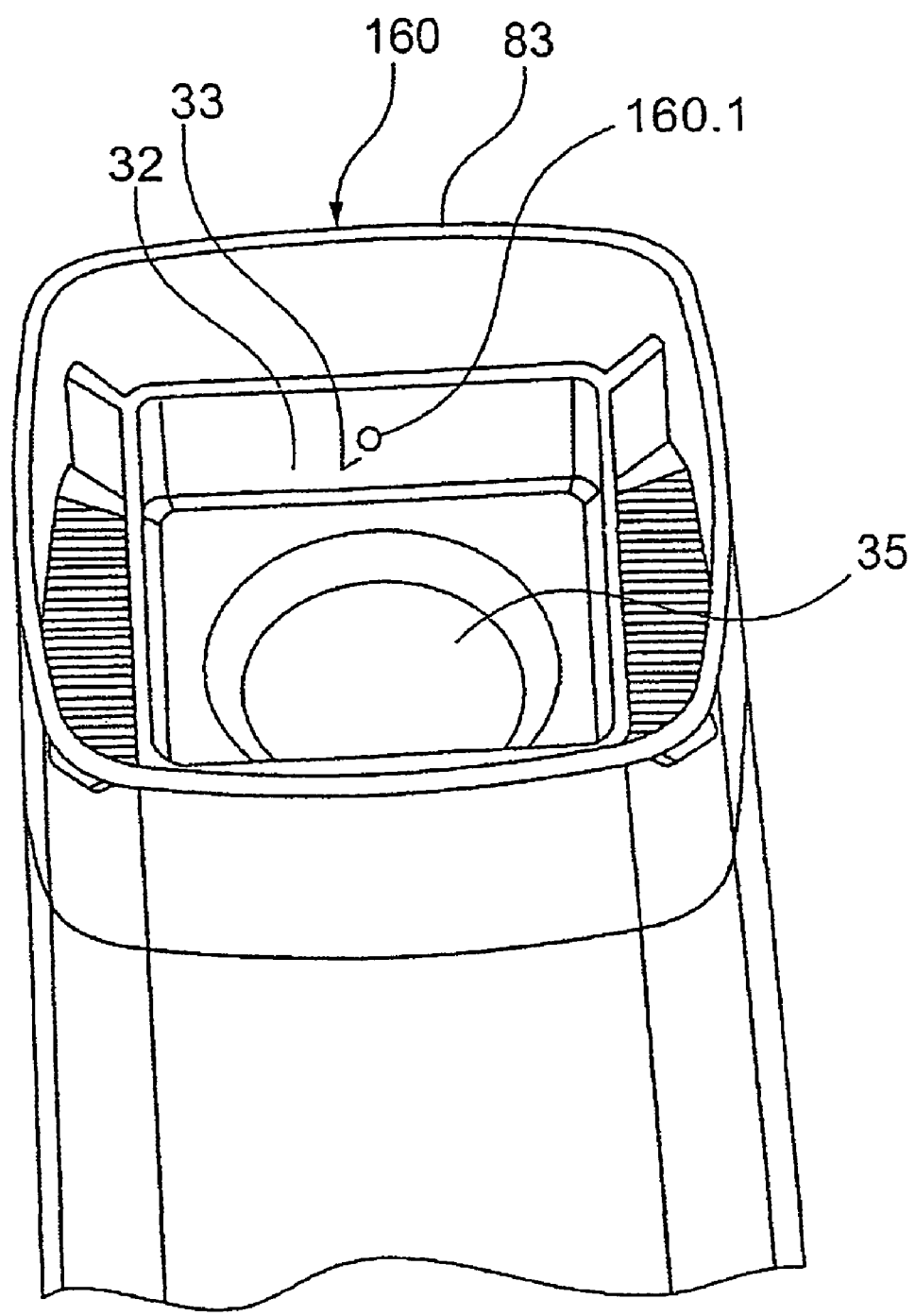

FIGS. 41 to 43 illustrate a further embodiment in which the filter 31 is pushed into the interior of the tank along a guide which is arranged on a tank wall, has two angularly designed ribs R and engages into two complementary slots S. The tank has in its bottom 29 a polygonal, here hexagonal, filter connection element 23 and a tank outflow port 35 leading outward from inside this connection element through the tank wall.

In order to allow, on the one hand, a sufficient discharge of water through this tank outflow port 35 formed on the wall side and, on the other hand, as complete an emptying of the tank as possible, the polygonal connection element 23 is designed as a polygon located on the tank bottom and having a sloping top side. The filter-side tank connection element 32 in the form of a conically designed, likewise polygonal shaped seal 32 has a correspondingly complementarily inclined connection surface. As a result, the filter cartridge 31 can be introduced, guided and fixed by the ribs R and complementary slots S, vertically downward on the tank wall into the interior of the tank and can be inserted positively and sealingly through the coding structure thus formed, with the tank bottom, to filter the water located in the tank.

Preferably, in this embodiment, too, as also in all the other embodiments, a bypass structure, not illustrated here but as has been previously described, may also be formed, in order to allow a blending of the filtered water. A supplementary rib-shaped structure R and a complementary slot-shaped coding structure S are formed here by the end-face recess S in the filter wall and the complementary shape R of the outlet port 35 in the bottom region of the tank wall. These, too, may be modified correspondingly, for example in a square form, a triangular form or other structure having further recesses and/or projections, to differentiate between differently permitted filter types.

A further embodiment of a square coding for a tank/filter connection is illustrated in FIGS. 44 to 47. This embodiment has, in addition to the embodiment illustrated in FIG. 6, a bypass structure. This bypass structure comprises, following the bypass structure, illustrated in FIGS. 7 to 20, in the end-face housing prolongation of the filter cartridge 73, a port in the form of a bore 160 which, in congruence with a port 165 formed in a tank-side filter socket connection element 77, allows the passage of untreated water located in the tank toward the tank-side appliance connection in the outflow region of the tank for admixing to the water filtered by the filter cartridge. In this case, on the filter side, the bypass port 160 is formed in the end-face prolongation of the filter and implements a blending device in combination with the tank-side filter connection element 77.

A further possibility for implementing a blending device could be achieved by arranging this bypass port 160 opposite a port 106 formed in the outer shell 84, in which case a corresponding ducting must be formed, if appropriate, inside the filter cartridge and/or inside the tank-side connection element, in order to admix the blending water thus released to the filtered water flowing out through the filter cartridge from its outflow port 35.

A further blending structure may be implemented by the formation of a bypass port 160.1 in the polygonal filter-side tank connection element 32, here in the form of a square shaped seal 32, said bypass port matching again with the port 165 formed in the tank-side filter connection 77. The size of the port 161.1 in this case once again determines the blending quantity. In this embodiment, the blending device is implemented directly in the sealing region of the polygonally designed tank/filter connection.

Figure 48:
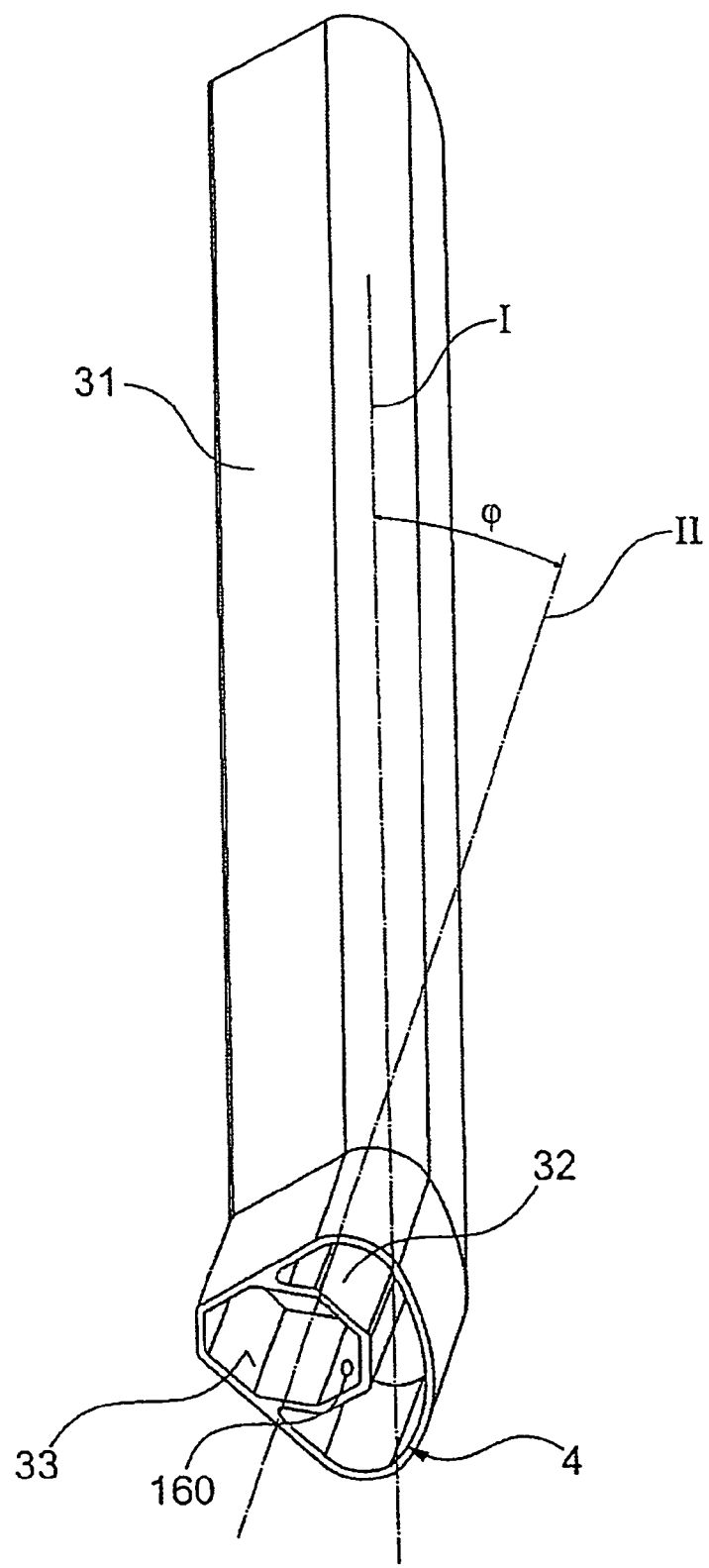
Figure 49:
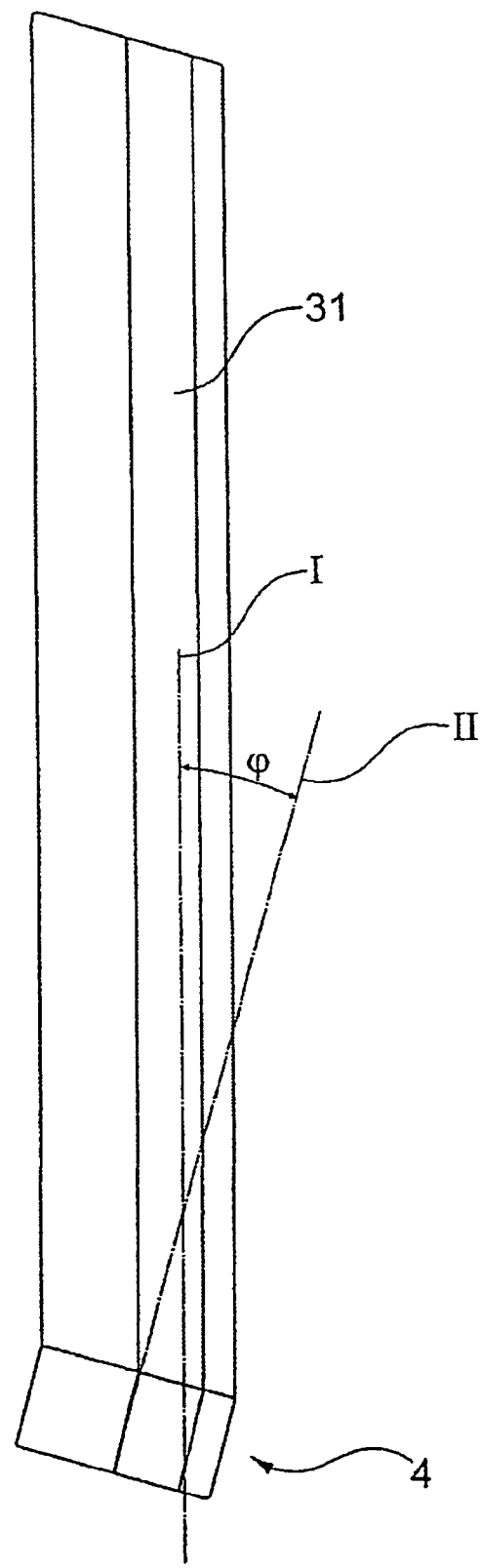

FIGS. 48 and 49 show an embodiment of a tank/filter connection in which a longitudinal axis II running through the filter-side tank connection element 4 is oriented at an oblique angle with respect to a longitudinal axis I running through the housing of the filter cartridge 31, here preferably at an acute angle ϕ. This oblique-angled or bent or sloped orientation of the filter-side tank connection element 4 with respect to the remaining filter housing constitutes a further form of mechanical coding which can be combined with further coding forms already described above, in particular with a polygonal connection element, illustrated here, in the form of an octagon. This, octagon may preferably likewise be designed as a shaped seal and, as illustrated here, may have a bypass or blending device in the form of a port 160 which, in the presence of a complementary element in the tank-side filter connection element, allows a corresponding blending of the water to be filtered.

FIG. 48 shows the filter cartridge 31 in an oblique view from below, in which the filter-side connection element 4 and its essential features can be seen. By contrast, FIG. 49 shows a side view in which the angling between the cartridge housing 31 and the filter-side tank connection 4 is shown at an angle illustrated by way of example.

Figure 50:
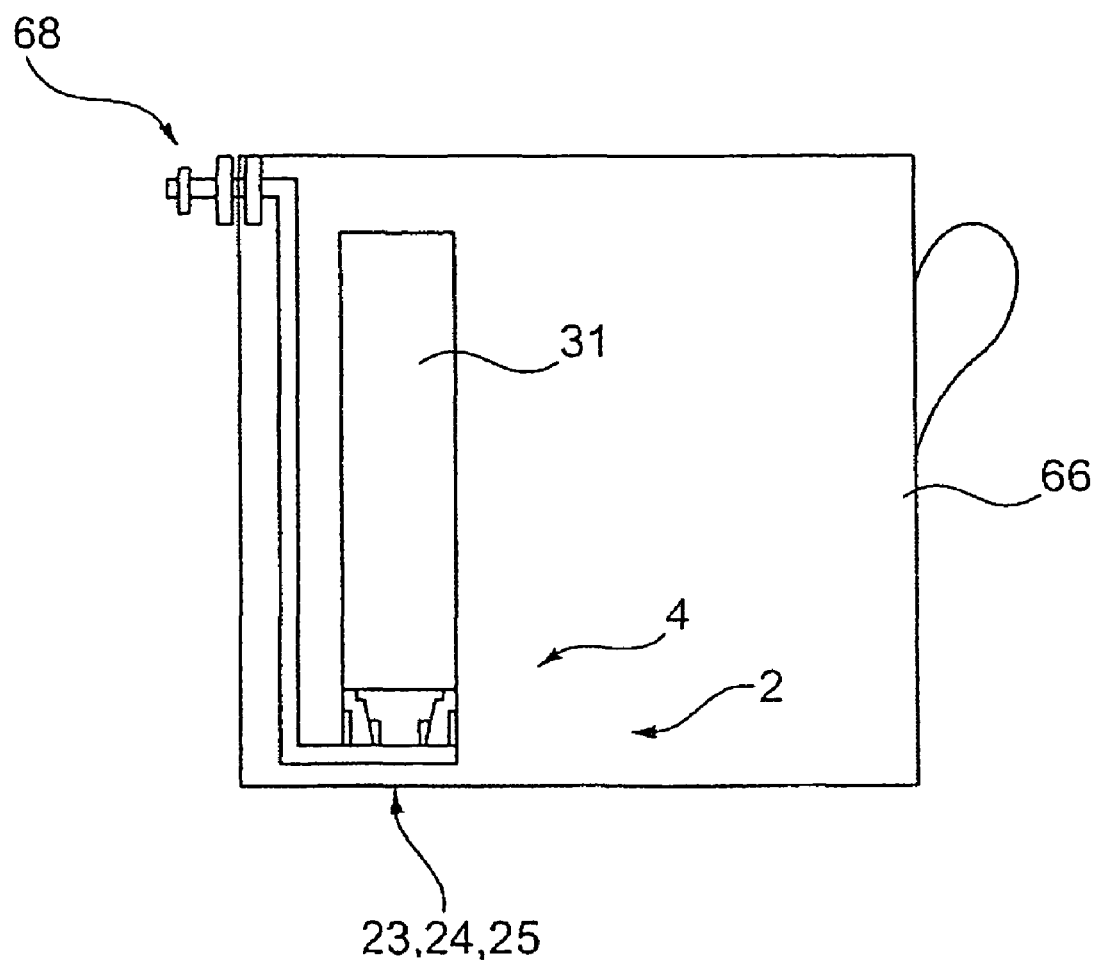

FIG. 50 shows a further embodiment in which the tank is again designed as a push-in tank in which a cartridge 31 for filtering the water contained in it is connected to a tank-side filter connection element 2. This tank-side connection element 2 is connected to the tank-side appliance connection 68 via a line, here preferably in the form of a stable pipe. This tank-side appliance connection 68 is led, spaced apart from the operational bottom-side region of the tank 66, outward from the tank interior. In this embodiment, the appliance connection 68 is fixed, for example, in a recess which is introduced in the top edge of a tank wall and which may advantageously be designed as a releasable connection, so that simple removal and cleaning become possible.

The operation of the tank is possible simply by pushing it into a correspondingly designed receptacle of an appliance and its filling with fresh water subsequently to be filtered by the filter 31 or it is possible for the tank to be pulled out. The tank-side filter connection element 2 may in this case have all the above-described coding and/or fixing and/or sealing features, so that in this embodiment shown in the drawing (FIG. 50), the use of a filter cartridge not operationally intended can be reliably precluded, which, moreover, also applies to the version according to FIGS. 41 to 43.

Figure 51:
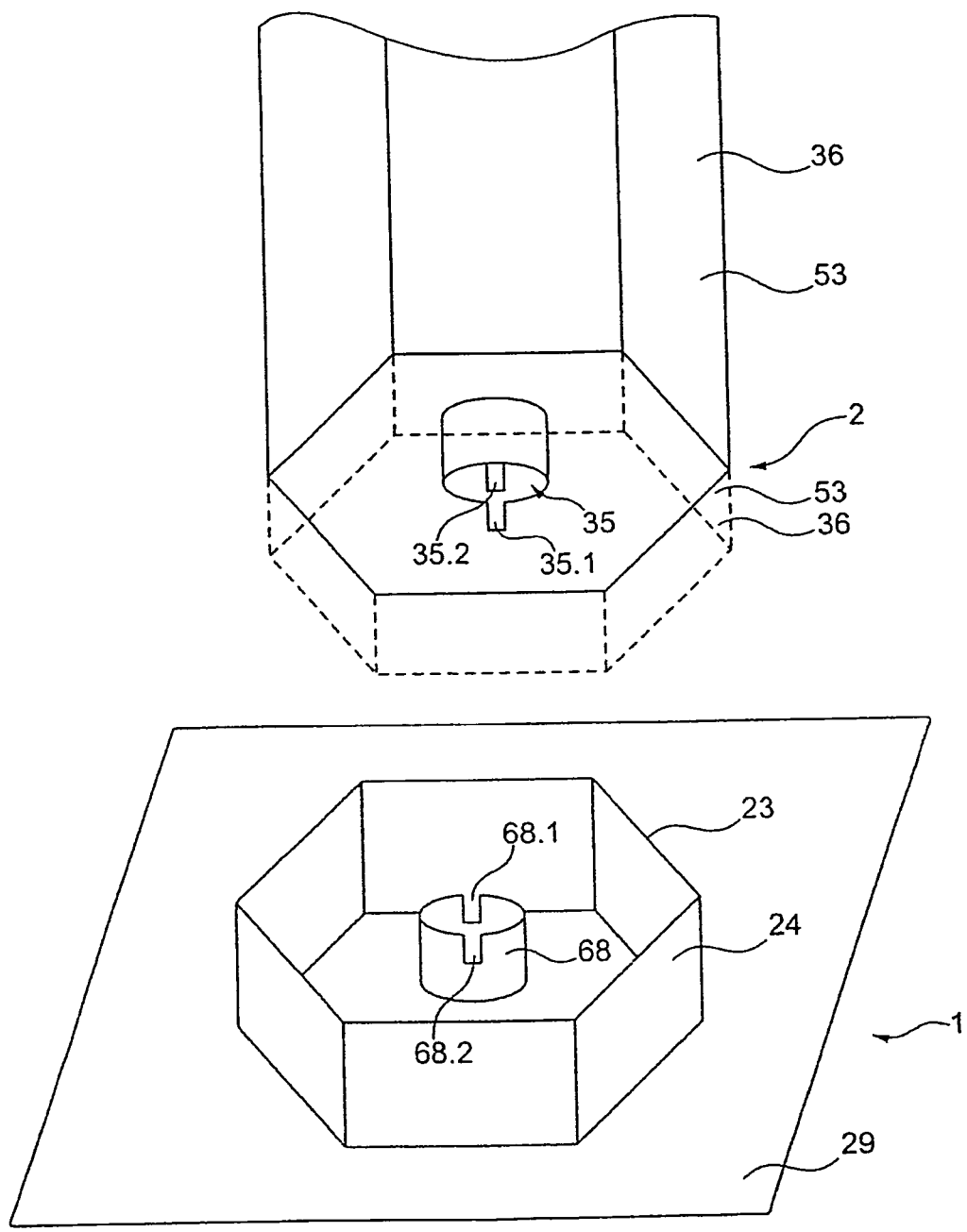

Two further possible embodiments of codings of the connection between tank and filter are illustrated and described with reference to FIGS. 51 and 52. In FIG. 51, the housing of the filter cartridge 53 itself has a polygonal outer contour in the form of a hexagon which can be inserted into a complementary tank-side polygonal coding and/or fixing structure 23. The unbroken lines show the filter cartridge 53 in a view obliquely from below, with a basically planar bottom in its middle, the filter outlet 35 for the filtered water being designed, for example, as a cylindrically projecting pipe with two end-face axially projecting extensions 35.1 and 35.2. This cylindrically projecting outlet element 35 is coded by means of the two axially projecting wings and forms with its end face, with respect to the end face of a complementary outlet and reception element 68 formed in the tank-side filter connection, with its coding grooves 68.1 and 68.2, an axial coding and/or sealing structure or contour. The filter cartridge 53 can be plugged operably into the tank-side filter connection element 1 only when the end face of the filter outlet 35 fits together sealingly with the end face of the tank-side appliance outlet 68.

The hexagonal outer contour, illustrated here by way of example, of the filter cartridge 53 can, in the embodiment illustrated by the unbroken lines, be plugged fixingly and, if appropriate, also sealingly into the connecting socket 23 of the tank-side filter connection element 1. In this case, the inner circumference of the connecting socket 23 serves for fixing and, if appropriate, for sealing with respect to the outer circumference or with respect to its connection.

In order to show a further fastening possibility between the polygonal outer contour, illustrated here by way of example as a hexagon, of the filter cartridge 53 and a correspondingly complementary tank-side connecting socket 1, the housing 36 of the filter cartridge 53 is illustrated by the broken lines as being prolonged with respect to the filter bottom described above. This polygonal connecting ring projecting with respect to the bottom of the filter cartridge can, to fix the filter cartridge, be slipped over the tank-side filter connection piece 23, again fixingly and preferably sealingly, depending on the version, or can likewise be plugged in, until the two inner codings of the filter outlet 35 and of the tank outlet 68 stand sealingly against one another or their wing-like and complementary slot-like coding structures, shown here by way of example, stand sealingly one against the other or engage one in the other. For routing the water from the tank into the interior of the filter cartridge, corresponding ports and/or ducts are provided, which, however, are not shown here but have been previously discussed. Corresponding bypass structures, such as have already been described above in detail, may likewise be provided but are not shown here but have been previously discussed. FIG. 51 thus shows a fixing of the filter cartridge both to the inner circumference of the tank-side filter connection element 23 and to its outer circumference sealing surface 24.

Figure 52:
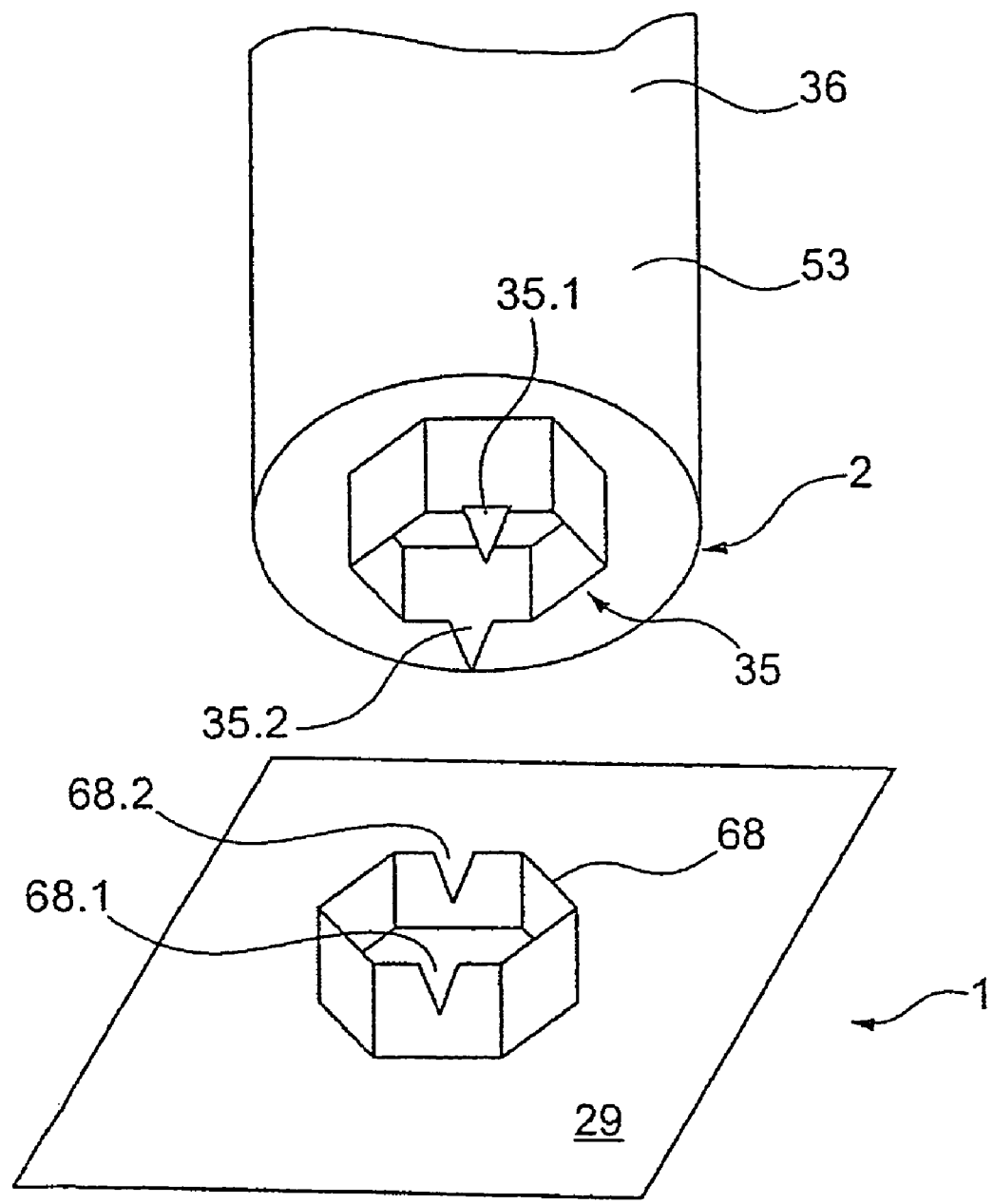

By contrast, FIG. 52 shows an embodiment modified in that the housing 36 of the filter cartridge is illustrated by way of example as being round and the filter outlet 35 as a polygonal structure, here again, by way of example, as a hexagon, which additionally again has an end-face coding in the form of two axially projecting coding triangular tips or wings. Here, too, the filter cartridge can be connected operably to the tank-side filter connection element 1 only when the two outlet structures 35 and 68 can be appended to one another axially sealingly on the end face. An illustration of further coding and/or fixing structures has been dispensed with for the sake of clarity. However, all the structures already described above may also be provided correspondingly here. It also applies to the two embodiments according to FIGS. 51 and 52 that these coding structures may also be interchanged between the filter side and tank side and/or be modified and/or be supplemented by further contours and/or structures.

Figure 53:
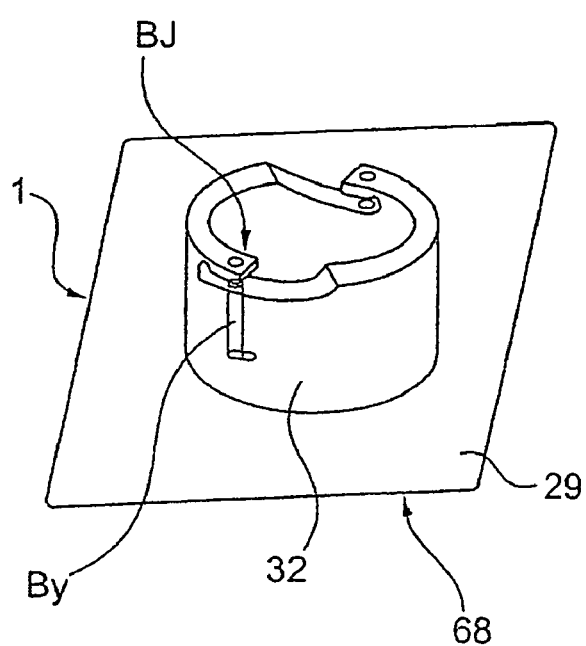
Figure 54:
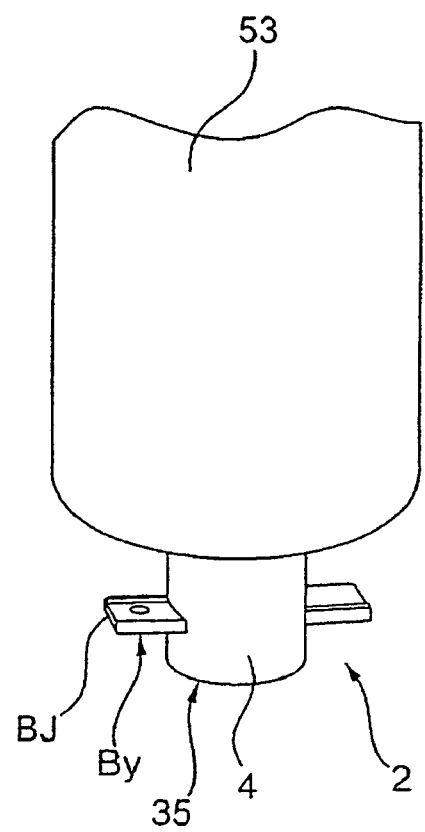

Two further possibilities for implementing a bypass configuration between a tank-side filter connection element 1 and a filter-side tank connection element 2 are illustrated in FIGS. 53 to 56. FIGS. 53 and 54 show here, by way of example and diagrammatically, a bypass arrangement BY which allows a blend between water filtered by the filter cartridge 53 and a water not or otherwise filtered or treated. The bypass or blending stage BY, in this embodiment, is combined with a bayonet fastening BJ in such a way that a bayonet wing BJ has provided in it a port BY which matches with a further bypass port BY arranged on a bayonet slot BJ complementary to the bayonet wing, in such a way that, with the filter cartridge inserted operationally, a corresponding bypass routing is implemented. In the embodiment illustrated here, the bypass port BY shown in the tank-side filter connection element 1 is led from the end-face connection region of the tank-side connecting socket to below the location at which the filter-side tank connection piece 4 terminates in the operationally inserted position, so that the bypass water routed past the filter bed of the filter cartridge 53 is intermixed with the water filtered through the filter bed of the filter cartridge 53 and is supplied to the tank-side appliance connection 68.

Figure 55:
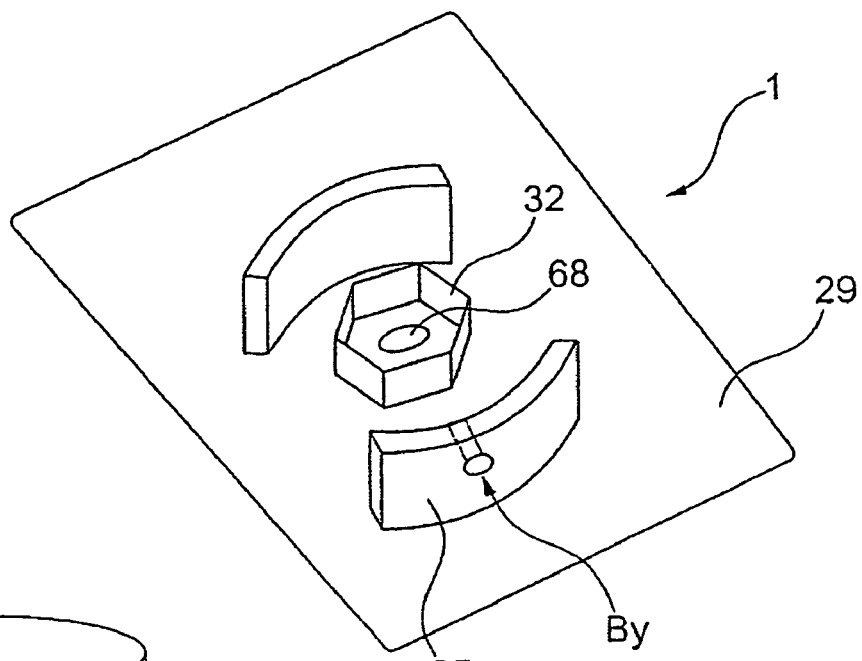
Figure 56:
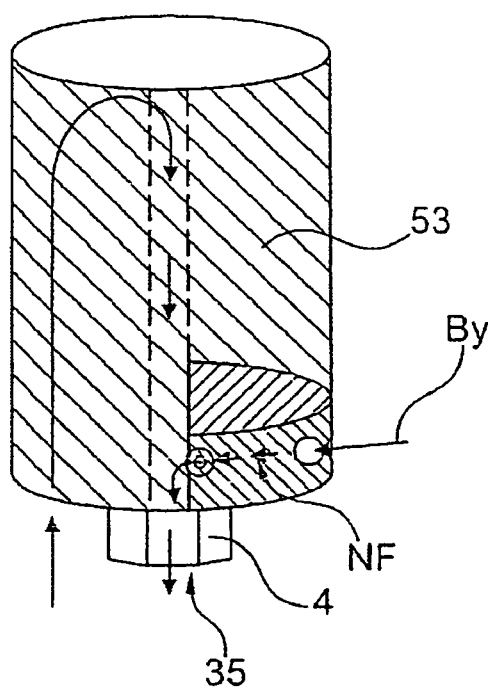

FIGS. 55 and 56 show an embodiment modified with respect to this in that the bypass stage BY is routed via a treatment and/or filter stage which is separate from a main filter bed HF of the filter cartridge 53 and which is illustrated here by way of example and symbolically as a secondary filter stage NF. This second treatment and/or filter stage NF may contain, for example, an activated charcoal filter stage and/or other treatment mechanisms and/or media. After flowing through this secondary filter stage NF, the water routed via this bypass stage BY is intermixed with the water filtered through the filter stage HF of the filter cartridge 53, so that it can likewise be extracted by means of the tank-side appliance connection 68.

In the embodiment of the filter cartridge 53, as shown in FIG. 56, the convergence of the two water stages, routed or treated separately via the main filter HF and via the secondary filter NF, inside the filter cartridge 53 by means of an issue into the inner down line of the filter cartridge 53 is illustrated by way of example and diagrammatically. In a modified embodiment, however, it is perfectly possible additionally or alternatively also to provide a specific outlet port out of the filter cartridge in the direction of the tank-side appliance connection 68, while, if appropriate, it may apply to all three embodiments that they all issue within the tank-side filter connection piece 4, so that, again by way of example, sealing is possible by means of a form fit of the two polygonal connection elements of the tank and of the filter.

The introduction of the bypass stream into the secondary filter stage is possible only when the port BY, likewise functioning as a coding, on the enciphering element on outer shell 25 rising axially from the tank bottom 29 is plugged in with the corresponding filter-side bypass port BY in the operationally intended state. If there is no overlap of these two ports, then no corresponding blending can be carried out. The tank-side filter connection 1 according to FIG. 55 is likewise illustrated only diagrammatically and by way of example and may be provided with the most diverse possible variants of the coding and connecting structure already described above, so that, if appropriate, only a single one of all six angular orientations possible here is freed for a permissible filter closure. An illustration of such coding structures has been dispensed with at this juncture for the sake of clarity.

It also basically applies to these embodiments in FIGS. 53 to 56 that they, too, may be combined with all the above-described coding and/or fixing and/or sealing structures.

LIST OF REFERENCE SYMBOLS

1 Connecting socket
2 Tank connection element
3
4 Connection piece
5
6 Side slot
23 Connecting socket
24 Sealing surface
25 Outer shell
26 Blocking element
27 Bottom rib
28 Bottom rib
29 Tank bottom
30 Inner rib
31 Filter cartridge
32 Shaped seal
33 Sealing surface
34 Inlet slot
35 Outflow port
36 Filter cartridge housing
37 Snap element
38 Receptacle
39 Bottom edge
40 Stop
41 Bottom port
42 Grooves
43 Key element
44 Tank connection region
45 Bottom
46 Axial seal
47 Separating line
48 Disk
49 Annular shoulder
50 Valve body
51 Spring
52 Tank bottom
53 Filter cartridge
54 Connecting socket
54.1 Connecting socket
55 Outer surface
56 Outflow line
57 Seal
58 Wall
59 Wall 60 Clearance
61 Port
62 Socket wall
63 Socket wall
64 Socket wall
65 Bypass port
66 Tank
67 Suction connection
68 Appliance connection
69 Longitudinal axis
70 Interspace
71 Edge
72 Connection element
73 Cartridge
74 Foot
75 Inflow port
76 Inflow port
77 Connecting socket
78 Bottom plate
79 Sealing surface
80 Sealing surface
81 Shaped seal
82 Outflow
83 Outer wall
84 Outer shell
85 Adaptor
86 Adaptor
87 Axial projection
88 Axial projection
89 Axial projection
90 Axial projection
91 Axial projection
92 Axial projection
93 Axial projection
94 Axial projection
95 Axial projection
96 Axial recess
97 Axial recess
98 Axial recess
99 Axial projection

What is claimed is:

1. In a tank for water-carrying appliances having a filter cartridge, a tank side filter connection, a tank outlet and a means for generating a vacuum and a suction connection to the tank outlet wherein the improvement comprises a tank outlet having a tank-side portion of a divided blending device and sealing surface (60, 65, 136.1, 160, 165, 336.1, 360, 365) with at least one blending port disposed on the tank outlet communicating directly or via a secondary filter stage to connect the tank interior to the tank outlet, said tank outlet accommodating a filter cartridge with a filter side connection element (2) having a filter side portion of the divided blending device and sealing surface having at least one blending port portion disposed in the sealing surface to connect the tank-side portion of the divided blending device with the filter side portion of the divided blending device to blend unfiltered water or water filtered via a secondary stage filter with water filtered through the filter cartridge wherein the tank outlet or a connection piece of the tank outlet and filter cartridge have a coding structure for selectively operating said blending device.

2. The tank as claimed in claim 1 wherein the blending device is adjustable.

3. The tank as claimed in claim 1 or 2 further comprising an angle-dependent blend setting for the blending device.

4. The tank as claimed in claim 1 or 2 wherein the filter cartridge (53) has at least one driver element (57) for actuating a tank-side blending quantity setting (54.1, 65.1, 65.2).

5. The tank as claimed in claim 1 wherein the filter connection (1) has at least one additional coding structure having at least one axial projection (99) and/or at least one axial recess (38) which matches a complementarily coding structure (98, 37) on the filter cartridge (31) employing a key/lock principle.

6. The tank as claimed in claim 1 wherein the coding structure is at the same time a fixing element (16) for fastening the filter cartridge.

7. The tank as claimed in claim 1 further comprising an axial sealing surface for the filter cartridge.

8. The tank as claimed in claim 1 or 2 further comprising a plurality of coding elements or coding structures and an encipherment of coding elements or coding structures.

9. The tank as claimed in claim 1 or 2 further comprising a circumferential sealing surface (24) disposed on the tank-side filter connection.

10. The tank as claimed in claim 1 wherein the tank-side filter connection element has a circumferential encipherment having a plurality of individual coding elements and coding structures.

11. The tank as claimed in claim 10 wherein the tank-side filter connection element has a symmetrical cross section.

12. The tank as claimed in claim 1 or 2 wherein the tank outlet has a coding structure for a filter side key element for the filter cartridge.

13. The tank as claimed in claim 1 or 2 wherein the filter-side tank connection element (2) has a coding structure and a correspondingly shaped seal (32).

14. The tank as claimed in claim 1 further comprising a coding structure and a seal (32) formed by the mating of the sealing surface of the tank-side portion of the divided blending device and the filter side portion of the divided blending device.

15. An adapter (85) for connecting a filter cartridge (31) to a tank having a tank side blending element comprising:
  (a) an adapter housing having a first end and a second end;
  (b) the first end of the adapter housing having an opening for sealably connecting with a filter cartridge;
  (c) the second end of the adapter housing having a first opening to connect with a tank side filter connection for connecting the filter cartridge to the inside of the tank and at least one port communicating with a tank side blending element and a-bottom interior wall of the tank to blend unfiltered water with filtered water from the filter cartridge; and
  (d) a coding structure disposed on said first end or said second end of said adapter housing.

16. A filter cartridge for insertion into a tank comprising:
  (a) a filter housing having a filter-side filter connection for mating with a corresponding tank side filter connection;
  (b) at least one filter side blending port portion disposed in said filter side connection for mating with a tank side blending port in the tank side filter connection, said at least one filter side blending port portion communicating directly with the inside of the tank and said tank side blending port; and
  (c) a coding structure disposed on said filter-side connection for mating with a corresponding coding structure on the tank side filter connection.

17. An appliance which uses filtered water comprising a tank having one portion of a divided blending device and an outlet disposed on a bottom wall of the tank and at least one blending port disposed in the tank outlet or in the bottom wall of the tank adjacent to the tank outlet for communicating with a filter cartridge having a second portion of a divided blending device, said at least one blending port communicating with at least one blending port portion of the filter cartridge to allow water in the tank to communicate directly with the outlet through the blending port in the outlet and a coding structure with a filter side coding structure disposed on the filter cartridge and a corresponding tank side coding structure disposed on the tank which mate to unite the divided blending device and to provide for the operation of said blending device.

18. The tank as claimed in claim 1 further comprising at least one driver element (57) for actuating a tank-side blending quantity setting (54.1, 65.1, 65.2).

19. The tank as claimed in claim 1 wherein the at least one blending port disposed on the tank and the at least one blending port disposed on the filter at least partially surround one another.

20. The adaptor of claim 15 further comprising a coding structure disposed on said second end of said housing.

21. The filter cartridge of claim 16 further comprising a coding structure disposed on the second end of the filter housing.

22. The appliance of claim 17 further comprising a coding structure disposed on said outlet.

23. A tank for a water appliance comprising:
(a) a tank having a tank outlet and a tank bottom and a first portion of a blending device and a first portion of a sealing surface disposed in said tank outlet or in said tank bottom adjacent to said tank outlet;
(b) at least one blending port disposed in said blending device disposed in the tank outlet or in the tank bottom communicating with the outlet in said tank;
(c) a coded encipherment disposed on the tank outlet or on said tank bottom adjacent to said tank outlet having a rotationally symmetrical contour with various predetermined angular positions for said blending device; and
(d) a filter cartridge with a second portion of the blending device and a second portion of said sealing surface and at least one blending port portion and a coded encipherment having a rotationally symmetrical contour with various predetermined angular positions for mating with said coded encipherment disposed on the tank outlet or on said tank bottom to unite said first portion and said second portion of said sealing surface to provide a seal and unite said first portion and said second portion of said blending device.

24. The tank of claim 23 wherein said at least one blending port in said tank outlet or in said tank bottom is a plurality of blending ports and said coded encipherment has a plurality of symmetrical areas to provide a selective mating of said at least one blending port in said filter cartridge with at least one of said plurality of blending ports in said tank outlet or on said tank bottom.

* * * * *

UNITED STATES PATENT AND TRADEMARK OFFICE
CERTIFICATE OF CORRECTION

| | | |
|---|---|---|
| PATENT NO. | : 8,252,180 B2 | Page 1 of 1 |
| APPLICATION NO. | : 12/310061 | |
| DATED | : August 28, 2012 | |
| INVENTOR(S) | : Kurt Wallerstorfer et al. | |

It is certified that error appears in the above-identified patent and that said Letters Patent is hereby corrected as shown below:

On the Title Page, Item (75)

The address of one of the joint inventors, Mr. Roland Scholz should be:

Roland Scholz, Balgach (CH)

Signed and Sealed this
Thirteenth Day of January, 2015

Michelle K. Lee
*Deputy Director of the United States Patent and Trademark Office*